(12) United States Patent
Yamaguchi

(10) Patent No.: US 8,300,764 B2
(45) Date of Patent: Oct. 30, 2012

(54) METHOD AND DEVICE FOR DETECTING PLACEMENT ERROR OF AN IMAGING PLANE OF A RADIOGRAPHIC IMAGE DETECTOR, AS WELL AS METHOD AND DEVICE FOR CORRECTING IMAGES

(75) Inventor: Yoshitaka Yamaguchi, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 389 days.

(21) Appl. No.: 12/585,436

(22) Filed: Sep. 15, 2009

(65) Prior Publication Data

US 2010/0067773 A1    Mar. 18, 2010

(30) Foreign Application Priority Data

Sep. 16, 2008 (JP) .................................. 2008-236728
Aug. 31, 2009 (JP) .................................. 2009-200423

(51) Int. Cl.
*G01N 23/04* (2006.01)
*H05G 1/64* (2006.01)
*G06K 9/38* (2006.01)

(52) U.S. Cl. .......................... 378/62; 378/98.8; 382/131

(58) Field of Classification Search .............. 378/28–32, 378/37, 51–56, 62, 91, 98, 98.6, 98.8, 98.12, 378/162, 163, 189–192, 204, 205, 207, 210; 382/129, 132, 103, 209, 216–221, 254, 266, 382/268, 275, 279, 284, 286, 287, 289, 293–297
See application file for complete search history.

(56) References Cited

U.S. PATENT DOCUMENTS

| | | | | |
|---|---|---|---|---|
| 6,600,831 | B1 * | 7/2003 | Sasada | 382/132 |
| 6,895,106 | B2 * | 5/2005 | Wang et al. | 382/132 |
| 7,142,632 | B2 * | 11/2006 | Atzinger et al. | 378/62 |
| 2005/0169427 | A1 * | 8/2005 | Halsmer et al. | 378/98.12 |
| 2006/0067590 | A1 * | 3/2006 | Inoue | 382/284 |
| 2008/0152088 | A1 * | 6/2008 | Wang et al. | 378/98.12 |

FOREIGN PATENT DOCUMENTS

| | | |
|---|---|---|
| JP | 11-244270 | 9/1999 |
| JP | 2006-156555 | 6/2006 |

* cited by examiner

*Primary Examiner* — Anastasia Midkiff
(74) *Attorney, Agent, or Firm* — Jean C. Edwards, Esq.; Edwards Neils PLLC

(57) ABSTRACT

For a radiographic image detector which includes an imaging plane including two-dimensional matrix of pixel sections, each pixel section storing, when exposed to radiation, a charge according to amount of the radiation, and which is used to be exposed to radiation transmitted through the same subject each time the detector is shifted along a predetermined axis of shift, an inclination of the two-dimensional matrix relative to the axis of shift of the radiographic image detector is detected. The inclination is detected by applying radiation two times to the detector at different radiation application positions effected by the shift of the detector so that a common marker is imaged during each radiation application; carrying out a reading operation after each radiation application to acquire image data representing image information of the marker; and detecting the inclination based on a positional relationship between marker images represented by the image data.

8 Claims, 11 Drawing Sheets a

CENTER OF
EXPOSURE FIELD

CENTER OF
EXPOSURE FIELD $H_\alpha$ (3×3 MATRIX)

$H_\gamma$ (3×3 MATRIX)

METHOD AND DEVICE FOR DETECTING PLACEMENT ERROR OF AN IMAGING PLANE OF A RADIOGRAPHIC IMAGE DETECTOR, AS WELL AS METHOD AND DEVICE FOR CORRECTING IMAGES

CROSS-REFERENCE TO RELATED APPLICATIONS

The present application claims priority from Japanese Patent Application No. 2008-236728, filed Sep. 16, 2008, and from Japanese Patent Application No. 2009-200423, filed Aug. 31, 2009, the contents of all of which are herein incorporated by reference in their entirety.

BACKGROUND OF THE INVENTION

1. Field of the Invention

The present invention relates to a method for detecting inclination and/or displacement of an imaging plane of a radiographic image detector during recording of radiographic image information on the detector, and a device for carrying out the method.

The present invention further relates to a method for applying, to image data representing a radiographic image of a subject acquired using the radiographic image detector, correction to eliminate misalignment along a joint line in a subject image which misalignment is generated when the subject image is formed by combining the image data, and a device for carrying out the method.

2. Description of the Related Art

A panel-shaped radiographic image detector has conventionally been used in practice, as described, for example, in Japanese Unexamined Patent Publication No. 2006-156555 (hereinafter ref erred to as patent document 1). The radiographic image detector includes an imaging plane having a two-dimensional matrix of pixel sections, and when radiation which carries image information is applied, each pixel section stores an electric charge depending on the amount of the radiation. Then, the radiographic image detector outputs image data representing the image information through a reading operation. In general, each pixel section includes: a charge generation layer for generating an electric charge when exposed to radiation; a voltage application electrode for applying a voltage to the charge generation layer; a charge collection electrode for collecting the electric charge generated at the charge generation layer; and a switching element for reading out the electric charge collected by the charge collection electrode, which are formed using, for example, a TFT (thin film transistor) active matrix array.

The above-described panel-shaped radiographic image detector typically has a quadrangular shape, i.e., a rectangular or square shape, and is widely used to record image information carried by radiation which has been transmitted through the subject and applied to the radiographic image detector. The radiographic image detector having the quadrangular shape may sometimes be used to record a long image representing a long portion, such as the entire spine, of the subject, such as a human body. In this case, the radiographic image detector is shifted along a predetermined axis of shift so that each time the radiographic image detector receives radiation transmitted through a different portion of the same subject.

When the panel-shaped radiographic image detector is used in this manner, the reading operation is carried out each time the radiation is applied (each time a radiographic image is recorded) to acquire image data representing a radiographic image during each reading operation. Subsequently, the sets of image data are combined to acquire image data representing the long portion of the subject. The method to acquire image data representing a long radiographic image in this manner is described, for example, in Japanese Unexamined Patent Publication No. 11(1999)-244270 (hereinafter referred to as patent document 2), in which a cassette containing a phosphorescent screen is used as an example.

When the radiographic images are combined as described above, misalignment along the joint line may be observed in the combined image due to inclination of the imaging plane of the panel-shaped radiographic image detector. There are several types of "inclination of the imaging plane" causing this problem. Now, the types of inclination are described in detail with reference to FIGS. 10 and 11.

First, FIG. 10 schematically shows, at "a", a side view of a system for recording (imaging) a radiographic image, which includes a radiation source 100, a stand 101 for guiding a quadrangular panel-shaped radiographic image detector D when it is shifted, and an imaging plane 102 in the radiographic image detector D. In this example, a grid 103 is recorded as the subject for the convenience of explanation of the problem. That is, radiation 104 emitted from the radiation source 100 and transmitted through the grid 103 is applied to the imaging plane 102 of the radiographic image detector D.

In this case, the quadrangular panel-shaped radiographic image detector D is orientated such that the panel surface and one side of the panel is parallel to a direction in which the stand 101 extends (the direction of arrow H), and is to be shifted in the direction of arrow H. That is, in this case, the direction of arrow H is the axis of shift. Then, first and second radiographic imaging operations are carried out by applying the radiation 104 transmitted through the grid 103 to the radiographic image detector D, which is stationary before and after being shifted.

One problem here is that the imaging plane 102 (and thus the two-dimensional matrix of pixel sections forming the imaging plane) may be inclined by an angle α with respect to the surface of the panel due to assembly error, or the like, of the radiographic image detector D. In such a case, radiographic images of the grid 103 imaged through the first and second application of the radiation are distorted, as shown at "b" and "c" in FIG. 10. That is, when the first and second recorded images are joined at an area in the vicinity of the lower edge of the first image and an area in the vicinity of the upper edge of the second image, the transverse length of the subject is different between theses areas, and misalignment is generated along the joint line.

It should be noted that, in this case, with the radiographic image detector D being set as described above, the inclination angle α of the imaging plane 102 relative to the panel surface is the inclination angle of the two-dimensional matrix relative to the axis of shift H.

Next, the other problem is described with reference to FIG. 11. FIG. 11 schematically shows, at "a", a front view of the system for recording (imaging) a radiographic image, which includes the stand 101, the imaging plane 102, and the grid 103, as with FIG. 10. Although the radiation source is not shown in this drawing, the radiation source is disposed to apply radiation along an exposure axis which is perpendicular to the plane of the drawing.

The quadrangular panel-shaped radiographic image detector D is orientated in the same manner as shown in FIG. 10 and is to be shifted in the direction of arrow H. Then, first and second radiographic imaging operations are carried out by applying the radiation 104 to the radiographic image detector D, which is stationary before and after being shifted.

The other problem here is that the two-dimensional matrix of the pixel sections may be inclined by an angle γ with respect to the axis of the shift, i.e., the one side of the panel, in a plane parallel to the surface of the panel (i.e., a plane parallel to the plane of the drawing) due to assembly error, or the like, of the radiographic image detector D. It should be noted that only some of the pixel sections G are illustrated in FIG. 11. In such a case, radiographic images of the grid 103 imaged through the first and second application of the radiation are distorted, as shown at "b" and "c" in FIG. 11. That is, when the first and second recorded images are joined at an area in the vicinity of the lower edge of the first image and an area in the vicinity of the upper edge of the second image, misalignment which looks like faulting is generated along the joint line.

It should be noted that, also in this case, with the radiographic image detector D being set as described above, the inclination angle γ of the two-dimensional matrix relative to one side of the panel is the inclination angle of the two-dimensional matrix relative to the axis of shift H.

For example, in a case where the radiographic image detector D has a size of 40 cm×40 cm and a distance from the radiation source to the imaging plane (SID) is 180 cm, the misalignment along the joint line between the combined images is about 0.5 mm at an end of the image when the inclination angle α is 0.31 degrees, and is about 0.5 mm at an end of the image when the inclination angle γ is 0.07 degrees, which is fairly pronounced.

The above-described problems relate to cases where the quadrangular panel-shaped radiographic image detector is shifted precisely along the axis of shift which is parallel to the surface and one side of the detector, and the two-dimensional matrix of pixel sections is inclined within such a radiographic image detector. However, even when the two-dimensional matrix of pixel sections is not inclined within radiographic image detector, i.e., even when the matrix is formed parallel to the surface and one side of the quadrangular panel-shaped radiographic image detector, the similar problems occur when the radiographic image detector itself is inclined relative to the axis of shift of the detector. FIGS. 12 and 13 illustrate such cases where the two-dimensional matrix is inclined relative to the axis of shift of the detector by the inclination angles α and γ, respectively, since the radiographic image detector itself is inclined.

Further, in the above-described cases, the inclination of the matrix remains unchanged when the radiographic image detector is shifted. However, if the radiographic image detector is gradually inclined when it is shifted, the inclination of the matrix changes along with the shift of the radiographic image detector, and the similar problems occur. FIG. 14 schematically illustrates such a situation, and schematically shows, at "a", a front view of a system for recording (imaging) a radiographic image, which includes the stand 101, the imaging plane 102, and the grid 103, as with the system shown in FIG. 10 (this is the same for FIGS. 13 and 14). Although the radiation source is not shown in this drawing, the radiation source is disposed to apply radiation along an exposure axis which is perpendicular to the plane of the drawing.

It should be noted that, in this case, the matrix is inclined and is laterally displaced along with the shift of the radiographic image detector. This phenomenon is due to such factors that a guide mechanism for guiding the radiographic image detector being shifted has low accuracy, or that there is a relatively large clearance between a guide rod and a guide member that slides along the guide rod, for example, forming the guide mechanism.

Radiographic images of the grid 103 imaged during the first and second application of the radiation in this case are as shown at "b" and "c" in FIG. 14. Also in this case, the misalignment which looks like faulting is generated along the joint line when the first and second recorded images are joined at the area in the vicinity of the lower edge of the first image and the area in the vicinity of the upper edge of the second image.

Further, as described above, the problem of misalignment along the joint line between the images occurs not only due to the inclination of the matrix, but also due to displacement of the matrix from a predetermined position during application of the radiation. Now, the displacement is described in detail.

FIG. 15 schematically shows a situation where the displacement occurs. FIG. 15 schematically shows, at "a", a side view of a system for recording (imaging) a radiographic image, where the numeral "100" denotes the radiation source. When images to be combined are taken, the radiographic image detector D is essentially placed, during the first and second application of the radiation, at each of predetermined positions which overlap with each other to some extent. However, if a mechanism for shifting the radiographic image detector D, for example, is aged, the radiographic image detector D may be displaced from the predetermined position in a direction which is parallel to the axis of shift H during each application of radiation. FIG. 15 shows an example in which the radiographic image detector D is displaced downward by a length Δy from the predetermined position for the second application of the radiation.

Radiographic images of the grid 103 imaged during the first and second application of the radiation in this case are as shown at "b" and "c" in FIG. 15. In this case, the images are combined with assuming that the position $y_0$ (see the drawing) on the image taken during the first imaging operation corresponds to the upper end of the image taken during the second imaging operation. Actually, however, the upper end of the image taken during the second imaging operation is displaced by the length Δy, and thus misalignment is generated along the joint line.

Further, the above-described displacement may occur not only in the direction parallel to the axis of shift H but also in a direction perpendicular to the axis of shift H. FIG. 16 schematically shows a situation where such displacement occurs. FIG. 16 schematically shows, at "a", a front view of a system for recording (imaging) a radiographic image. Although the radiation source is not shown in this drawing, the radiation source is disposed to apply radiation along an exposure axis which is perpendicular to the plane of the drawing.

When images to be combined are taken, the radiographic image detector D is essentially placed, during the first and second application of the radiation, at each of predetermined positions which are aligned with each other in the direction perpendicular to the axis of shift H. If, however, a mechanism for shifting the radiographic image detector D is aged or the stand 101 (more particularly, a rail for guiding the radiographic image detector D being shifted) is bent, as shown in the drawing, the radiographic image detector D may be displaced from the predetermined position in the direction perpendicular to the axis of shift H during the application of radiation. In the example shown in FIG. 16, the radiographic image detector D is displaced from the predetermined position for the second application of radiation to the right by a length of Δx.

Radiographic images of the grid 103 imaged during the first and second application of the radiation in this case are as shown at "b" and "c" in FIG. 16. In this case, the images are combined with assuming that the images taken during the first and second imaging operations are aligned with each other along the transverse direction, i.e., in the direction perpendicular to the axis of shift H. Actually, however, the image taken during the second imaging operation is displaced by the length of Δx, and thus misalignment is generated along the joint line.

The above-mentioned patent document 2 discloses a method for correcting misalignment between two images when the two images are combined (in this case, misalignment due to a difference of distances between the subject and the imaging plane), in which a grid contained in a cassette is imaged together with the subject, and the correction is carried out based on the grid image contained in each image. This method, however, cannot detect the inclination and/or displacement of the two-dimensional matrix which may occur when the above-described quadrangular panel-shaped radiographic image detector is used, and thus cannot correct misalignment between the images based on such an inclination and/or displacement.

SUMMARY OF THE INVENTION

In view of the above-described circumstances, the present invention is directed to providing an image correction method that can eliminate, through a simple operation, misalignment along a joint line between combined images due to inclination and/or displacement from a predetermined position of the two-dimensional matrix of a radiographic image detector, and a device for carrying out the method.

The invention is further directed to providing a placement error detection method for detecting inclination and/or displacement from a predetermined position of the two-dimensional matrix of the radiographic image detector, and a device for carrying out the method, in order to accomplish the above-described image correction method.

A first aspect of the placement error detection method for detecting placement error of an imaging plane of a radiographic image detector according to the invention is to detect the above-described inclination of the two-dimensional matrix of pixel sections of the imaging plane relative to the axis of shift of the radiographic image detector. Specifically, the placement error detection method is to be used with a radiographic image detector including an imaging plane, the imaging plane including a two-dimensional matrix of pixel sections, each pixel section storing, when exposed to radiation, an electric charge according to amount of the radiation, the radiographic image detector outputting image data representing radiographic image information of a subject acquired through a reading operation, the radiographic image detector being used to be exposed to radiation transmitted through the same subject each time the radiographic image detector is shifted to a different position along a predetermined axis of shift, the method detecting inclination of the matrix relative to the axis of shift, the method including: applying radiation two times to the radiographic image detector at different radiation application positions effected by the shift of the radiographic image detector so that a common marker is imaged during each radiation application; carrying out the reading operation after each radiation application to acquire image data representing radiographic image information of the marker; and detecting the inclination based on a positional relationship between marker images represented by the image data acquired during each reading operation.

The inclination of the matrix relative to the axis of shift to be detected with the method may be an inclination in a plane containing exposure axes of the radiation applied during the two times of radiation application, or an inclination in the imaging plane.

The inclination of the matrix may remain unchanged when the radiographic image detector is shifted, or may change along with the shift of the radiographic image detector (the latter includes a case where the inclination does not occur depending on the shift position).

A second aspect of the placement error detection method for detecting placement error of an imaging plane of a radiographic image detector according to the invention is to detect the above-described displacement of the two-dimensional matrix of pixel sections of the imaging plane from a predetermined position for the matrix when the matrix is exposed to the radiation. Specifically, the placement error detection method is to be used with a radiographic image detector including an imaging plane, the imaging plane including a two-dimensional matrix of pixel sections, each pixel section storing, when exposed to radiation, an electric charge according to amount of the radiation, the radiographic image detector outputting image data representing radiographic image information of a subject acquired through a reading operation, the radiographic image detector being used to be exposed to radiation transmitted through the same subject each time the radiographic image detector is shifted to a different position along a predetermined axis of shift, the method detecting a displacement of the matrix from a predetermined position for the matrix when the matrix is exposed to the radiation, the method including: applying radiation two times to the radiographic image detector at different radiation application positions effected by the shift of the radiographic image detector so that a common marker is imaged during each radiation application; carrying out the reading operation after each radiation application to acquire image data representing radiographic image information of the marker; and detecting the displacement based on a positional relationship between marker images represented by the image data acquired during each reading operation.

The displacement of the matrix to be detected with this method may be a displacement in a direction perpendicular to the axis of shift, or a displacement in a direction parallel to the axis of shift.

A first aspect of the placement error detection device for detecting placement error of an imaging plane carries out the first aspect of the placement error detection method. The device includes: radiation application means for applying, to the radiographic image detector, radiation transmitted through a common marker; shifting means for shifting the radiographic image detector in a direction of the axis of shift; image data acquiring means for acquiring image data from the radiographic image detector each time the radiographic image detector is shifted and the radiation is applied to the radiographic image detector; and calculation means for calculating the inclination based on a positional relationship between marker images represented by the acquired image data.

A second aspect of the placement error detection device for detecting placement error of an imaging plane carries out the second aspect of the placement error detection method. The device includes: radiation application means for applying, to the radiographic image detector, radiation transmitted through a common marker; shifting means for shifting the radiographic image detector in a direction of the axis of shift; image data acquiring means for acquiring image data from the radiographic image detector each time the radiographic image detector is shifted and the radiation is applied to the radiographic image detector; and calculation means for calculating the displacement based on a positional relationship between marker images represented by the acquired image data. On the other hand, a first aspect of the image correction method according to the invention is an image correction method including: after the inclination has been detected with the first aspect of the placement error detection method, applying radiation transmitted through a subject to the radiographic image detector more than one times with shifting the radiographic image detector between the more than one times of radiation application; carrying out the reading operation after each radiation application to acquire image data representing radiographic image information of the subject; and applying image processing to at least a part of the image data acquired during each reading operation based on the detected inclination to eliminate misalignment along a joint line in an image of the subject due to the inclination, the misalignment being generated when the image of the subject is formed by combining the image data.

A second aspect of the image correction method according to the invention is an image correction method including: after the displacement has been detected with the second aspect of the placement error detection method, applying radiation transmitted through a subject to the radiographic image detector more than one times with shifting the radiographic image detector between the more than one times of radiation application; carrying out the reading operation after each radiation application to acquire image data representing radiographic image information of the subject; and applying image processing to at least a part of the image data acquired during each reading operation based on the detected displacement to eliminate misalignment along a joint line in an image of the subject due to the displacement, the misalignment being generated when the image of the subject is formed by combining the image data.

A first aspect of the image correction device according to the invention carries out the first aspect of the image correction method. The device includes: image correction means for applying image processing to at least a part of the image data acquired during each reading operation based on the detected inclination to eliminate misalignment along a joint line in an image of the subject due to the inclination, the misalignment being generated when the image of the subject is formed by combining the image data.

A second aspect of the image correction device according to the invention carries out the second aspect of the image correction method. The device includes: image correction means for applying image processing to at least a part of the image data acquired during each reading operation based on the detected displacement to eliminate misalignment along a joint line in an image of the subject due to the displacement, the misalignment being generated when the image of the subject is formed by combining the image data.

In the first aspect of the placement error detection method for detecting placement error of an imaging plane according to the invention, radiation is applied two times to, for example, a quadrangular panel-shaped radiographic image detector at different radiation application positions effected by the shift of the radiographic image detector along the axis of shift so that a common marker is imaged during each radiation application, the reading operation is carried out after each radiation application to acquire image data representing radiographic image information of the marker, and the inclination of the matrix of pixel sections of the imaging plane is detected based on a positional relationship between marker images represented by the image data acquired during each reading operation. Thus, the inclination can easily be detected.

In the second aspect of the placement error detection method for detecting placement error of an imaging plane according to the invention, radiation is applied two times to a radiographic image detector at different radiation application positions effected by the shift of the radiographic image detector along the axis of shift so that a common marker is imaged during each radiation application, the reading operation is carried out after each radiation application to acquire image data representing radiographic image information of the marker, and the displacement of the matrix of pixel sections of the imaging plane is detected based on a positional relationship between marker images represented by the image data acquired during each reading operation. Thus, the displacement can easily be detected.

It should be noted that the placement error detection method for detecting placement error of an imaging plane according to the invention is applicable not only to elimination of misalignment along a joint line between combined images, but also to determination of an amount of modification when the inclination and/or displacement of the imaging plane is manually and physically modified, for example.

On the other hand, the first aspect of the placement error detection device according to the invention includes: radiation application means for applying, to the radiographic image detector, radiation transmitted through a common marker; shifting means for shifting the radiographic image detector in a direction of the axis of shift; image data acquiring means for acquiring image data from the radiographic image detector each time the radiographic image detector is shifted and the radiation is applied to the radiographic image detector; and calculation means for calculating the inclination based on a positional relationship between marker images represented by the acquired image data. Thus, the device can implement the first aspect of the placement error detection method of the invention.

The second aspect of the placement error detection device according to the invention includes: radiation application means for applying, to the radiographic image detector, radiation transmitted through a common marker; shifting means for shifting the radiographic image detector in a direction of the axis of shift; image data acquiring means for acquiring image data from the radiographic image detector each time the radiographic image detector is shifted and the radiation is applied to the radiographic image detector; and calculation means for calculating the displacement based on a positional relationship between marker images represented by the acquired image data. Thus, the device can implement the second aspect of the placement error detection method of the invention.

The first aspect of the image correction method according to the invention uses the above-described method, which allows easily detecting the inclination of the matrix of pixel sections of the imaging plane, to apply image processing to eliminate the misalignment along the joint line in the combined image due to the detected inclination. Thus, elimination of the misalignment along the joint line can easily be achieved.

The second aspect of the image correction method according to the invention uses the above-described method, which allows easily detecting the displacement of the matrix of pixel sections of the imaging plane, to apply image processing to eliminate the misalignment along the joint line in the combined image due to the detected displacement. Thus, elimination of the misalignment along the joint line can easily be achieved.

The first aspect of the image correction device according to the invention includes image correction means for applying image processing to at least a part of the image data acquired during each reading operation based on the detected inclination to eliminate misalignment along a joint line in an image of the subject due to the inclination, the misalignment being generated when the image of the subject is formed by combining the image data. Thus, the device can implement the first aspect of the image correction method.

The second aspect of the image correction device according to the invention includes image correction means for applying image processing to at least a part of the image data acquired during each reading operation based on the detected displacement to eliminate misalignment along a joint line in an image of the subject due to the displacement, the misalignment being generated when the image of the subject is formed by combining the image data. Thus, the device can implement the second aspect of the image correction method.

DESCRIPTION OF THE PREFERRED EMBODIMENTS

Hereinafter, embodiments of the present invention will be described in detail with reference to the drawings.

Figure 1:
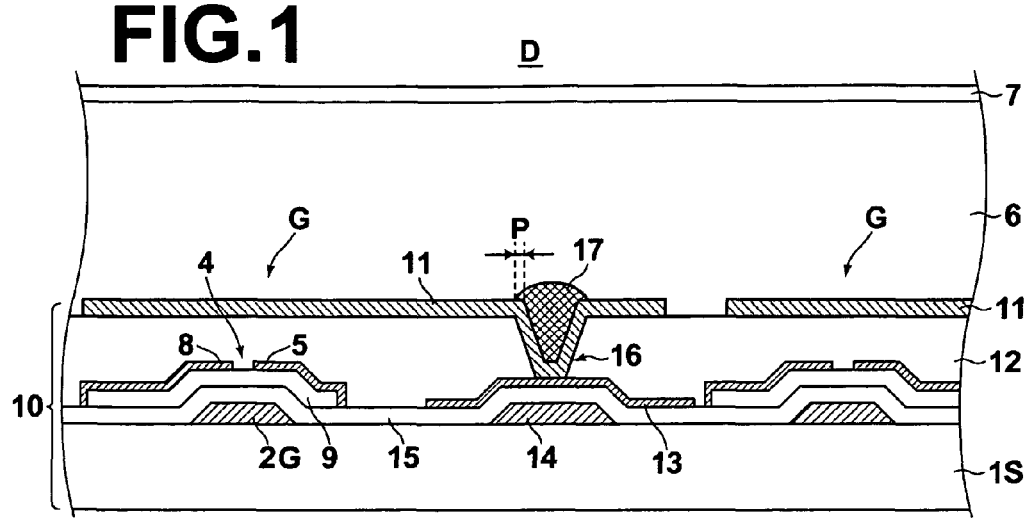
FIG. 1 is a partial side view illustrating one example of a radiographic image detector to be subjected to imaging plane inclination detection.

First, one example of a radiographic image detector, to which a placement error detection method for detecting placement error of an imaging plane according to the invention is applied, is described. FIG. 1 is a partial sectional view showing an area around pixel sections of such a radiographic image detector D. As shown in the drawing, the radiographic image detector D includes an active matrix substrate 10 including a number of pixel sections G, and a charge generation layer (photoelectric conversion layer) 6 having electromagnetic conductivity and a voltage application electrode (bias electrode: common electrode) 7 connected to a high voltage power supply (not shown), which are formed in this order on the active matrix substrate 10.

The pixel sections G include switching elements for reading out electric charges collected by the charge collection electrodes, as will be described later, and one pixel section G is formed per switching element. The large number of pixel sections G are arranged in a two-dimensional matrix, i.e., arranged in the transverse direction in FIG. 1 and in the direction perpendicular to the plane of FIG. 1. When the charge generation layer 6 is exposed to an electromagnetic wave, such as X-ray, the charge generation layer 6 generates an electric charge (electron-hole) therein. In other words, the charge generation layer 6 has electromagnetic conductivity, and converts image information carried by the radiation into electric charge information. The charge generation layer 6 is formed, for example, of a-Se consisting primarily of selenium.

The active matrix substrate 10 includes a glass substrate 1S, a gate electrode 2G, a gate insulating film 15, an upper storage capacitor electrode 13, a semiconductor layer 9, a source electrode 8, a drain electrode 5, an interlayer insulating film 12 and a charge collection electrode 11, where the gate electrode 2G, the gate insulating film 15, the source electrode 8, the drain electrode 5, the semiconductor layer 9, and the like, form a thin film transistor (TFT) 4, which serves as a switching element (hereinafter referred to as a TFT switch 4). In the TFT switch 4, the source electrode 8 and the drain electrode 5 are connected to data wiring (not shown), which is electrode wiring arranged in a grid pattern, and to the upper storage capacitor electrode 13. The semiconductor layer 9 serves to provide contact between the source electrode 8, the drain electrode 5 and the gate electrode 2G.

The glass substrate 1S is a support substrate and is formed, for example, of an alkali-free glass substrate. The gate insulating film 15 is formed, for example, of $SiN_x$ or $SiO_x$. The gate insulating film 15 is formed to cover the gate electrode 2G and the lower storage capacitor electrode 14. A portion of the gate insulating film 15 above the gate electrode 2G serves as a gate insulating film of the TFT switch 4, and a portion of the gate insulating film 15 above the lower storage capacitor electrode 14 serves as a dielectric layer of a charge storage capacitor. That is, the charge storage capacitor is formed at an area where the upper storage capacitor electrode 13 overlaps with the lower storage capacitor electrode 14, which is formed in the same layer as the gate electrode 2G.

The gate electrode 2G and the lower storage capacitor electrode 14 are formed on the glass substrate 1S. The semiconductor layer 9 is formed above the gate electrode 2G via the gate insulating film 15. The source electrode 8 and the drain electrode 5 are formed on the semiconductor layer 9. The gate insulating film 15 is formed above the lower storage capacitor electrode 14, and the upper storage capacitor electrode 13 is formed above the gate insulating film 15 above the lower storage capacitor electrode 14.

The interlayer insulating film 12 is formed, for example, of a photosensitive acrylic resin and serves to electrically isolate the TFT switches 4 from each other. A contact hole 16 is formed in the interlayer insulating film 12, so that the charge collection electrode 11 connects to the upper storage capacitor electrode 13, which is a signal extracting electrode, via the contact hole 16.

The charge collection electrode 11 is formed, for example, of a transparent amorphous conductive oxide film, and is formed above the source electrode 8, the drain electrode 5 and the upper storage capacitor electrode 13. The charge collection electrode 11 and the charge generation layer 6 are electrically connected to each other, so that the electric charge generated at the charge generation layer 6 can be collected at the charge collection electrode 11. The charge collection electrode 11 is electrically connected to the drain electrode 5 and the charge storage capacitor of the TFT switch 4 via the contact hole 16 formed in the interlayer insulating film 12 to collect the electric charge generated at the charge generation layer 6 and output the electric charge to the outside via the TFT and the data wiring (not shown). The charge generation layer 6 is formed immediately above the charge collection electrode 11 to pass the electric charge to the charge collection electrode 11.

A potential grading member 17 is disposed in the contact hole 16 and an area around the contact hole 16 such that the potential grading member 17 fills up the contact hole 16. The area around the contact hole 16 (the area denoted by "P" in FIG. 1) refers to an area within about 5 μm from the edge of the contact hole. The potential grading member 17 may be provided with a curvature that eases the edge of the contact hole 16.

The potential grading member 17 may be formed of an organic resin having a low dielectric constant and a coefficient of thermal expansion that is approximately the same as that of the material forming the charge generation layer 6, and specific examples thereof include photosensitive resins, such as novolac resin, epoxy resin, acrylic resin, urethane resin, polyester resin, polyimide resin, and polyolefin resin.

The high voltage power supply (not shown) is connected between the bias electrode 7 and lower storage capacitor electrode 14. The high voltage power supply applies a voltage between the bias electrode 7 and the lower storage capacitor electrode 14, thereby generating an electric field between the bias electrode 7 and the charge collection electrode 11 via the charge storage capacitor. The charge generation layer 6 and the charge storage capacitor are electrically connected in series. Thus, while a bias voltage is applied to the bias electrode 7, the charge generation layer 6 exposed to radiation, such as X-ray, generates an electric charge (electron-hole pairs) therein. The electrons generated in the charge generation layer 6 move toward the positive electrode and the holes generated in the charge generation layer 6 move toward the negative electrode. As a result, the electric charge is stored in the charge storage capacitor.

The radiographic image detector D as a whole includes the two-dimensionally arranged charge collection electrodes 11, the charge storage capacitors individually connected to the charge collection electrodes 11, and the TFT switches 4 individually connected to the charge storage capacitors. Thus, by once storing two-dimensional electromagnetic information in the charge storage capacitors and sequentially scanning the TFT switches 4, two-dimensional electric charge information can be read out as electric image data (an image signal).

As described above, in the radiographic image detector D, the electric charge is stored in each pixel section G. Herein, the plane in which the pixel sections G are arranged, i.e., the plane parallel to the charge generation layer 6, is referred to as the imaging plane.

Next, embodiments of the placement error detection method for detecting placement error of the imaging plane and an image correction method according to the invention are described. First, a case is described, where, among various types of placement errors, in particular, the previously-described inclination of the two-dimensional matrix of the pixel sections of the imaging plane relative to the axis of shift of the radiographic image detector is detected, and the misalignment along the joint line between the combined images due to the inclination is eliminated based on the detected inclination.

Figure 2:
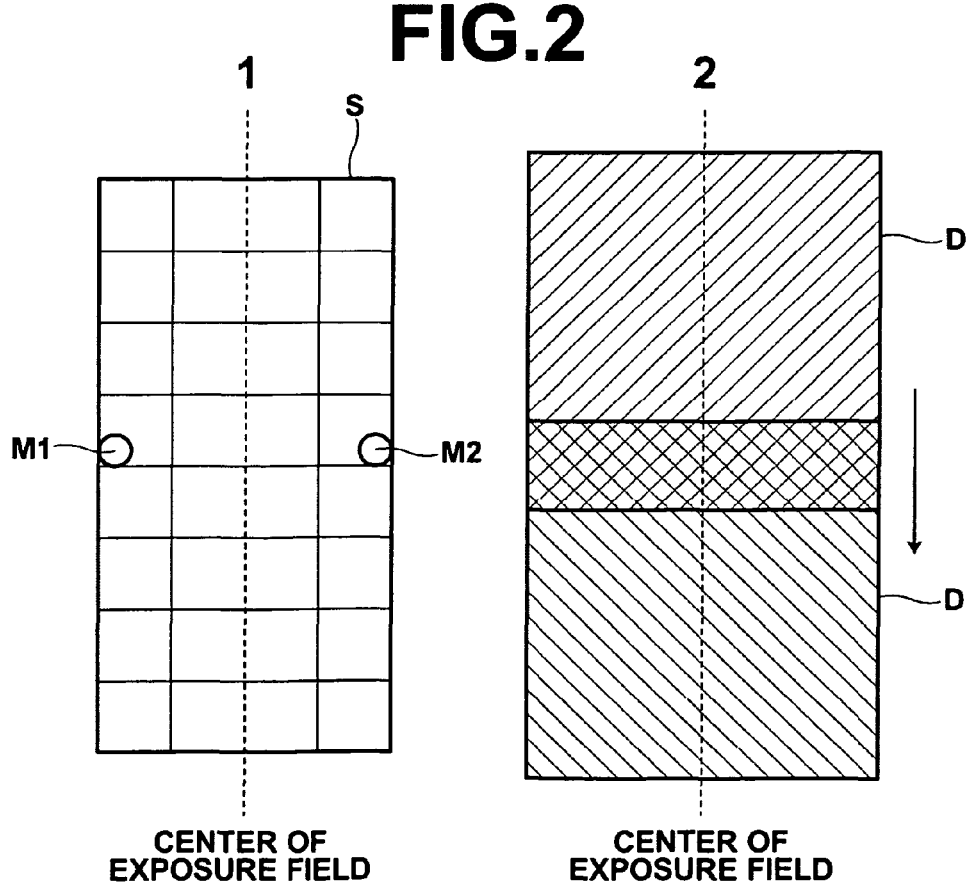
FIG. 2 is a schematic diagram for explaining radiographic imaging carried out for detecting the inclination of the imaging plane.
Figure 10:
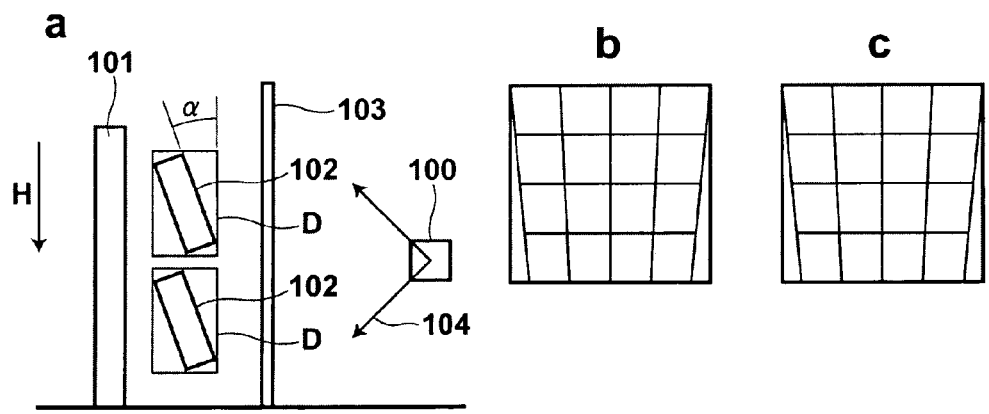
FIG. 10 is a diagram for explaining a prior-art problem.
Figure 11:
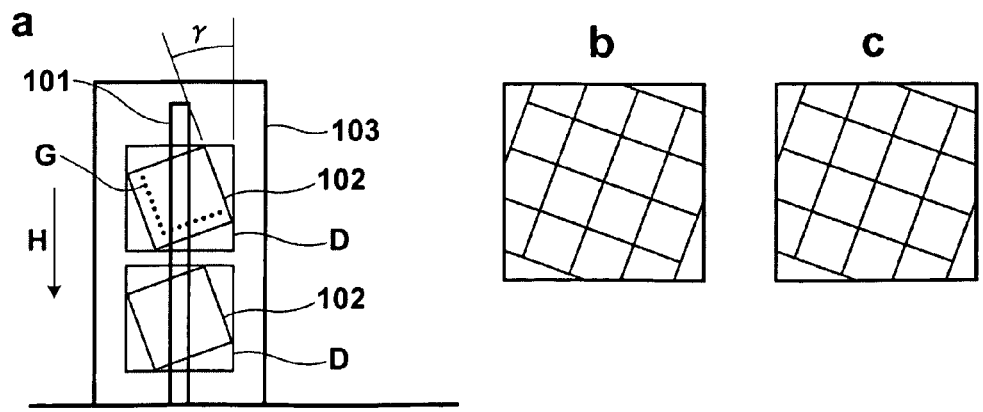
FIG. 11 is a diagram for explaining another prior-art problem.

First, a marker is imaged with an imaging system having the basic structure as shown in FIGS. 10 and 11. At this time, in place of the grid 103 shown in FIG. 10, a subject plane S as shown at "1" in FIG. 2 is placed, and two markers M1 and M2, which are spaced from each other by a predetermined distance in the horizontal direction, are held on the subject plane S. The radiographic image detector D held by the stand 101 is placed behind the subject plane S, i.e., on the side opposite from the radiation source 100.

As shown at "2" in FIG. 2, the quadrangular (rectangular or square) panel-shaped radiographic image detector D is shifted from the upper position to the lower position. The radiation transmitted through the markers M1 and M2 is applied to the stationary radiographic image detector D before and after being shifted, thereby taking two radiographic images of the markers M1 and M2. The imaging operations at this time may be achieved, for example, by swiveling the radiation source or expanding the radiation exposure field to cover an area corresponding to two panels.

During the two radiographic imaging operations, the radiographic image detector D is in the position indicated by the diagonally right up hatching shown at "2" in FIG. 2 for the first imaging operation, and is in the position indicated by the diagonally left up hatching shown at "2" in FIG. 2 for the second imaging operation, so that the markers M1 and M2 are contained in both of the images taken by the two imaging operations. During these imaging operations, the radiographic image detector D and the subject plane S are set such that the center positions in the width direction of the radiographic image detector D and the subject plane S are aligned with the center of the exposure field of the radiation (the center in the transverse direction). The two markers M1 and M2 are set in positions at an equal distance from the center of the exposure field.

When the first radiographic imaging operation has been done, the above-described reading operation is carried out prior to the second imaging operation to acquire image data representing a radiographic image of the markers M1 and M2. Also, when the second radiographic imaging operation has been done, the reading operation is carried out to acquire similar image data.

Figure 3:
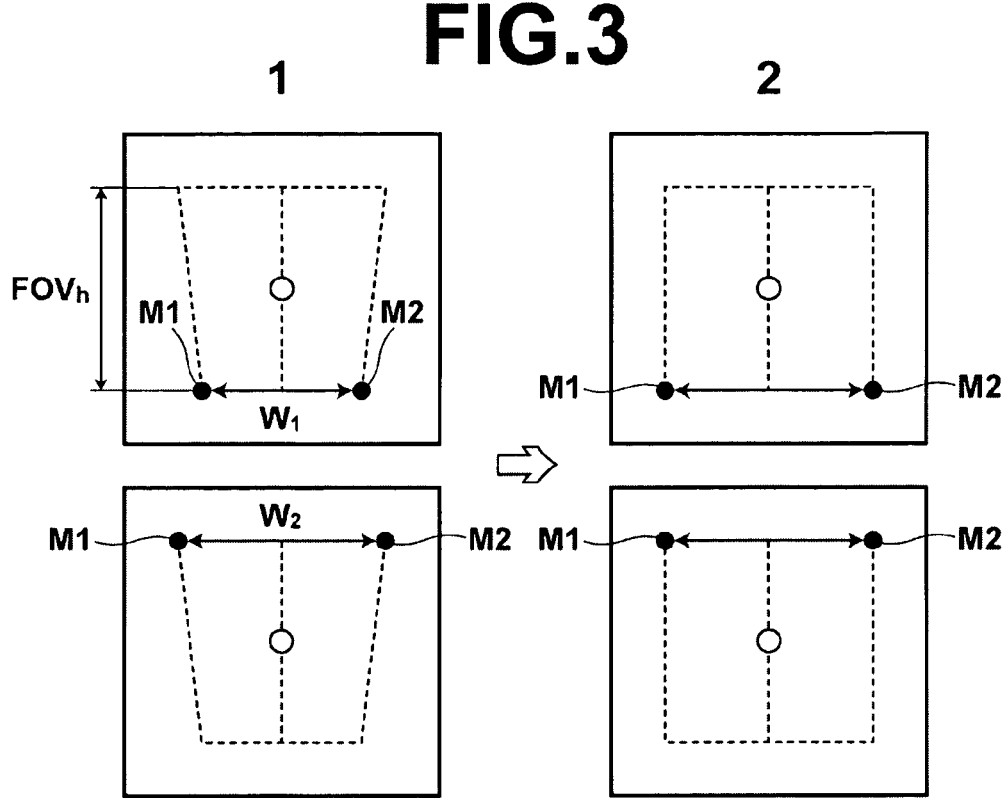
FIG. 3 is a schematic diagram for explaining states of recorded radiographic images when the imaging plane of the radiographic image detector is inclined and when the imaging plane is not inclined.

Next, how the inclination angle α shown in FIG. 10 is found is described. FIG. 3 shows, at "1", radiographic images represented by the image data acquired through the two reading operations. The upper radiographic image in the drawing is obtained by the first imaging and reading operation, and the lower radiographic image is obtained by the second imaging and reading operation. Both the radiographic images have the markers M1 and M2 recorded thereon. If the imaging plane 102 is inclined by the angle α relative to the panel surface, as shown in FIG. 10, positions of the markers M1 and M2 are misaligned between these radiographic images. The inclination of the imaging plane 102 occurs due to assembly error, or the like, when the structure such as one shown in FIG. 1 is assembled and fixed in a quadrangular panel housing (the same applies to inclination by the angle γ, which will be described later). In contrast, if the imaging plane is not inclined by the angle α, radiographic images shown at "2" in FIG. 3 are obtained. Thus, the angle α can be found from the relationship between the images shown at "1" and "2" in FIG. 3.

Figure 12:
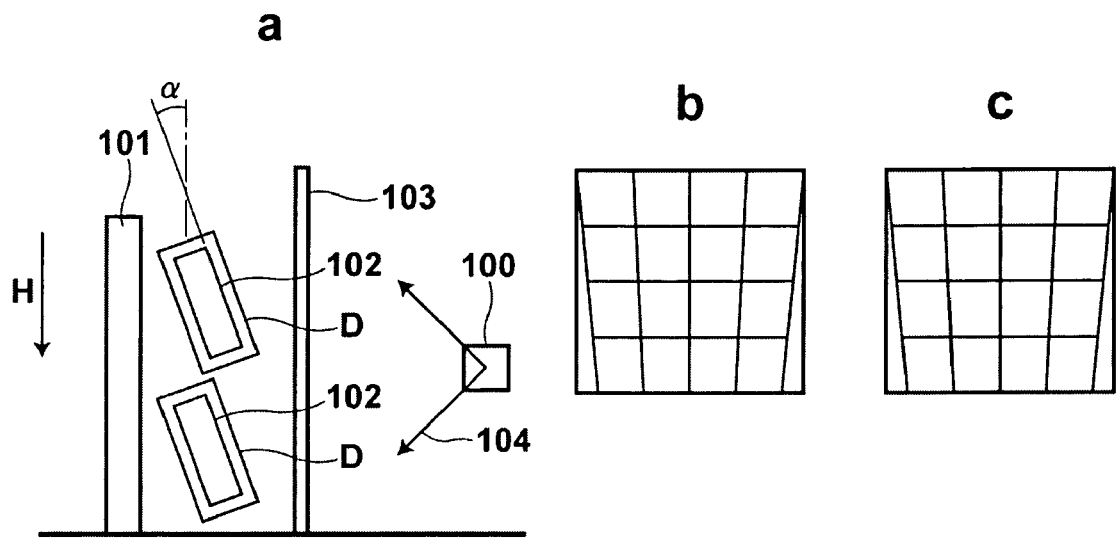
FIG. 12 is a diagram for explaining still another prior-art problem.

The angle α is an angle in a plane which contains exposure axes of the radiation applied during the two radiographic imaging operations (the two times of radiation application), i.e., a plane parallel to the plane of FIG. 10. This is also the same in the example of FIG. 12 shown above. Further, in this embodiment, the panel-shaped radiographic image detector D is placed such that the surface of the detector is parallel to the axis of shift of the detector (the direction of arrow H), and thus the angle α is an angle of the two-dimensional matrix of the pixel sections G arranged on the imaging plane 102 relative to the axis of shift of the detector.

Figure 4:
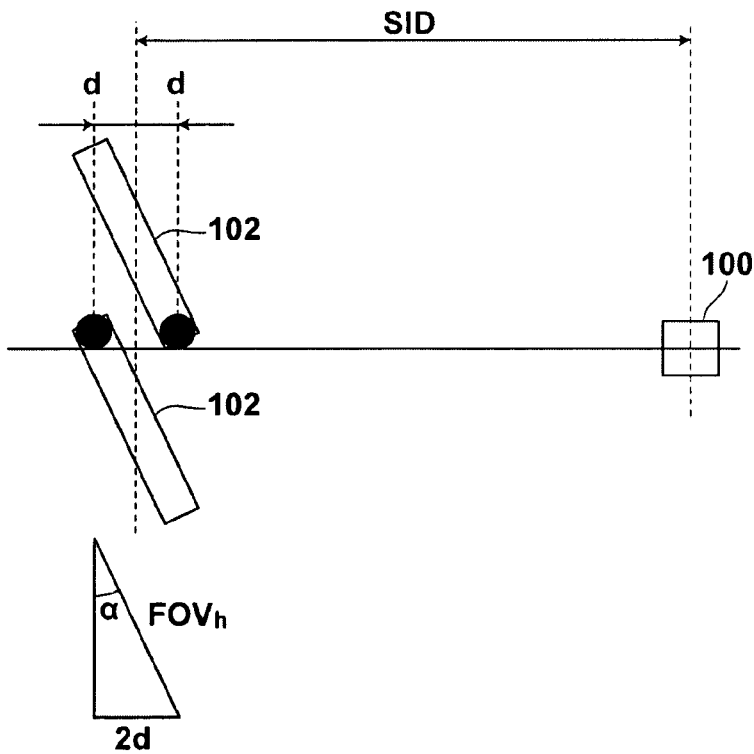
FIG. 4 is a schematic side view illustrating recording (imaging) of the radiographic images.

Here, for the images shown at "1" in FIG. 3, the distance between the markers M1 and M2 in the image acquired by the first operation is denoted by $w_1$ and the distance in the image acquired by the second operation is denoted by $w_2$. Further, as shown in FIG. 4, the distance from the center of the imaging plane to the markers M1 and M2 in the direction in which the radiation is applied is denoted by d, and the distance from the radiation source 100 to the center of the imaging plane is denoted by SID. Furthermore, as shown in FIGS. 3 and 4, twice the distance from the center of the imaging plane to a midpoint between the markers M1 and M2 on the imaging plane 102 is denoted by $FOV_h$. The relationships between the above distances are represented by equation 1 below, and equation 2 is obtained therefrom:

$$\begin{cases} w_1 \times \dfrac{SID+d}{SID} = w_2 \times \dfrac{SID-d}{SID} & \text{Equation 1} \\ \sin\alpha = \dfrac{2d}{FOV_h} \end{cases}$$

$$\sin\alpha = \frac{2(w_2-w_1)\cdot SID}{FOV_h \cdot (w_1+w_2)} \quad \text{Equation 2}$$

In this manner, the inclination angle α of the imaging plane 102 can be found from the above-described distances based on equation 2. To be exact, the difference between $w_1$ and $w_2$ fluctuates depending on the positional relationship between (the heights of) the radiographic image detector D and the radiation source 100, and thus the derived angle α also varies. However, usually d is sufficiently small relative to SID, and the fluctuation can be ignored to find the angle α through approximation by equation 2. It should be noted that the angle α in the example shown in FIG. 12 can be found in the same manner as described above.

Next, how the inclination angle γ shown in FIG. 11 is found is described. The angle γ is an angle of the two-dimensional matrix relative to the axis of shift of the detector (the direction of arrow H) within the plane of the imaging plane 102. This is the same in the above-described example shown in FIG. 13.

Figure 5:
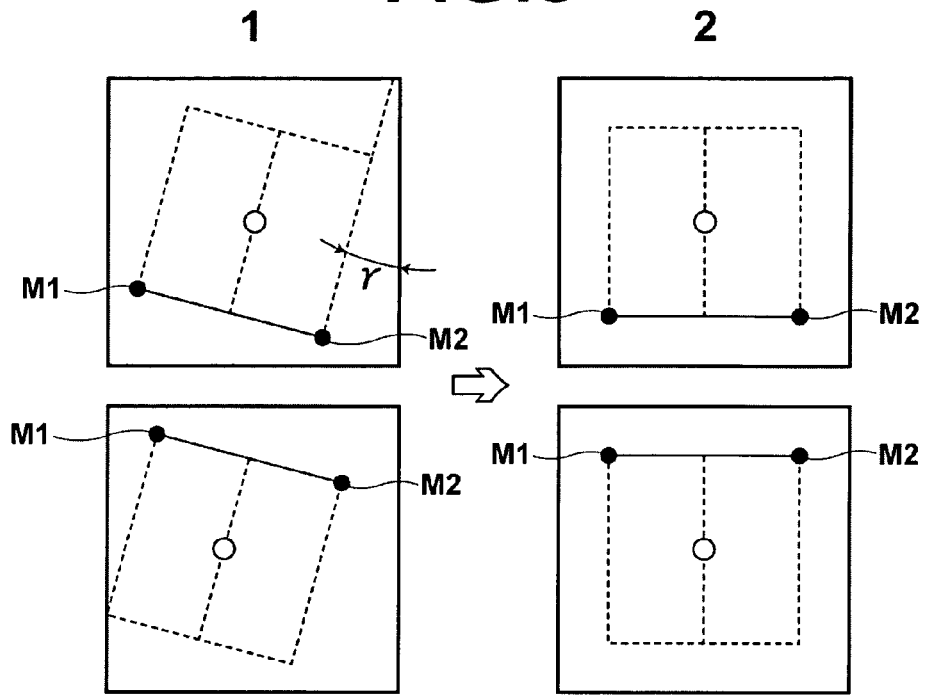
FIG. 5 is a schematic diagram for explaining states of recorded radiographic images when the imaging plane of the radiographic image detector is inclined and when the imaging plane is not inclined.

FIG. 5 shows, at "1", radiographic images represented by the image data acquired through the two reading operations. The upper radiographic image in the drawing is obtained by the first imaging and reading operation, and the lower radiographic image is obtained by the second imaging and reading operation. Both the radiographic images have the markers M1 and M2 recorded thereon. If the two-dimensional matrix of the pixel sections G is inclined by the angle γ relative to one side of the panel, as shown in FIG. 11, positions of the markers M1 and M2 are misaligned between these radiographic images. In contrast, if the imaging plane is not inclined by the angle γ, radiographic images shown at "2" in FIG. 5 are obtained. Thus, the angle γ can be found from the relationship between the images shown at "1" and "2" in FIG. 5.

Namely, assuming a square grid with one side thereof formed by a line segment connecting the centers of the markers M1 and M2 in each mage, as shown by dashed lines in FIG. 5, and shifting one of the radiographic images in the longitudinal and transverse directions relative to the other such that the center positions of the grid in the images are aligned to each other, the angle γ can be found from amounts of shift in the two directions. It should be noted that the angle γ in the example shown in FIG. 13 can be found in the same manner as described above.

Figure 6:
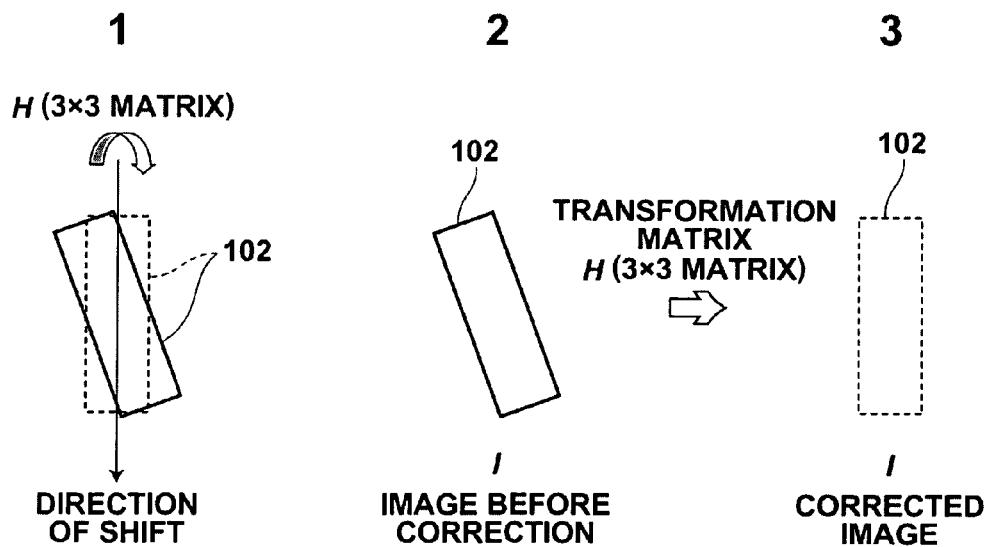
FIG. 6 is a schematic diagram for explaining one example of an image correction method according to the invention.

Next, a process to correct for distortion of the radiographic images due to the inclination based on the thus found angles α and γ is described. As one example, assuming a case where the imaging plane 102 is inclined in the direction of the angle α, as shown by solid lines at "1" in FIG. 6, and the subject is imaged through the first and second imaging operations in the state shown at "2" in FIG. 6. In this case, if the radiographic image of the subject record on and read out from the imaging plane 102 can be corrected to provide a radiographic image which is imaged in the state shown at "3" in FIG. 6, the distortion of the images due to the inclination by the angle α can be eliminated, thereby preventing misalignment at the joint line between the two images when they are combined. It should be noted that, in this embodiment, the images are also corrected to eliminate the distortion of the images due to the inclination in the direction of the angle γ of the imaging plane 102.

It is assumed that the shift of the radiographic image detector D has repeatability, and the radiographic image detector D is shifted during imaging of the subject similarly to when the angles α and γ are found.

Next, how parameters to be used in the correction are found is described. In this embodiment, a transformation matrix is found from the angles α and γ. More specifically, four or more representative points are set, and the transformation matrix is found based on correspondence between the representative points before and after transformation. First, in order to correct for the image distortion due to the inclination of the imaging plane in the direction of the angle α, parameters which allow the four representative points shown by black circles shown at "1" in FIG. 7 (which are assumed here to form a square in a correctly recorded state) to be corrected as the four representative points as shown at "2" in FIG. 7. The lengths of the distorted lower and upper sides of the uncorrected square are denoted by $w_1$ and $w_2$, respectively, and the lengths of lower and upper sides of the corrected square are denoted by $w_1'$ and $w_2'$, respectively. Then, the relationships expressed by equations 3 and 4 below are established. The variables other than $w_1$, $w_2$, $w_1'$ and $w_2'$ are the same as those described previously.

$$W_1' = W_1 \times \frac{SID + d}{SID}$$ Equation 3

$$\sin\alpha = \frac{2d}{FOV_h}$$

$$W_2' = W_2 \times \frac{SID - d}{SID}$$ Equation 4

$$\sin\alpha = \frac{2d}{FOV_h}$$

Then, the relationship expressed by equation 5 below is obtained from equation 3, and the relationship expressed by equation 6 below is obtained from equation 4.

$$W_1' = W_1 \times \left(1 + \frac{FOV_h \cdot \sin\alpha}{2SID}\right)$$ Equation 5

$$W_2' = W_2 \times \left(1 - \frac{FOV_h \cdot \sin\alpha}{2SID}\right)$$ Equation 6

Figure 7:
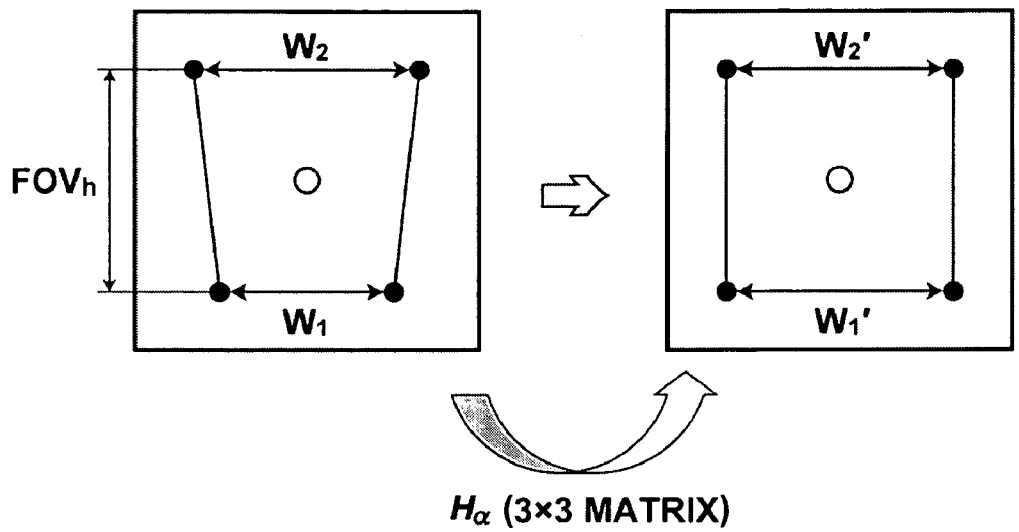
FIG. 7 is a schematic diagram for explaining another example of the image correction method according to the invention.

Then, the value in the parenthesis on the right-hand side of each of equations 5 and 6 is calculated based on the found angle $\alpha$ and the known SID and $FOV_h$, and the calculated values are respectively used as parameters to transform $w_1$ into $w_1'$ and $w_2$ into $w_2'$. Using these parameters, a (3×3) matrix $H_\alpha$ for transforming the image data representing the two-dimensional radiographic image shown at "1" in FIG. 7 into that shown at "2" in FIG. 7 is found.

Figure 8:
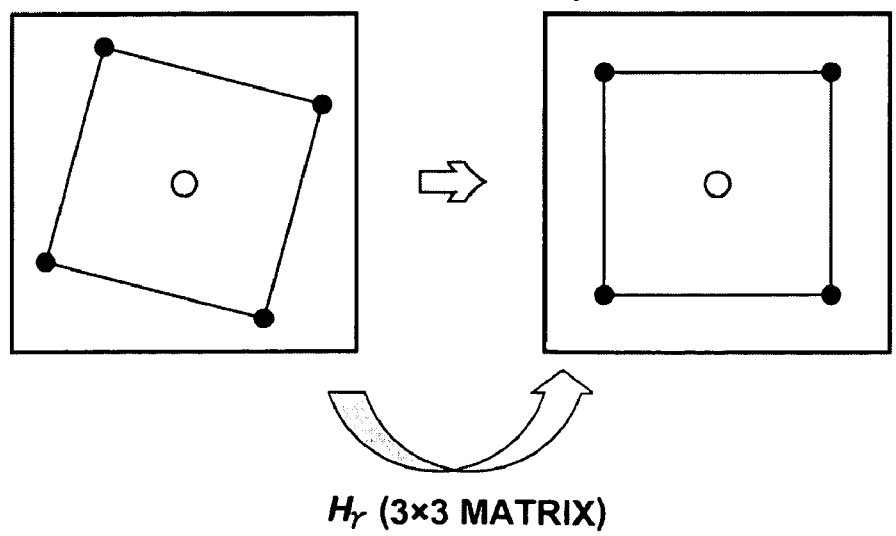
FIG. 8 is a schematic diagram for explaining still another example of the image correction method according to the invention.

Further, FIG. 8 shows, at "1" and "2", a relationship between a radiographic image before being rotated and the radiographic image rotated by the angle $\gamma$. In this case, a (3×3) matrix $H_\gamma$ for transforming the image data representing the two-dimensional radiographic image shown at "1" in FIG. 8 into that shown at "2" in FIG. 8 is found. The matrix for transforming an image according to a rotational relationship can be found using a conventionally known method.

Since the inclination of the imaging plane 102 in the two directions of angles $\alpha$ and $\gamma$ is summing of linear phenomena, the two types of inclination can be combined by multiplication of the matrixes as shown by equation 7 below:

$$H = H_\alpha H_\gamma \text{ or } H = H_\gamma H_\alpha$$ Equation 7

Then, the matrix H obtained by the multiplication of the matrixes shown by equation 7 is used as the transformation matrix. As the image data, which representing the radiographic image of the subject obtained through the first imaging and reading operation, is transformed, the transformed image data is free of the distortion due to the inclination of the imaging plane 102 in the directions of the angles $\alpha$ and $\gamma$. The same result is obtained when the image data representing the radiographic image of the subject obtained through the second imaging and reading operation is transformed. Thus, the two transformed radiographic images can be combined to provide a combined long radiographic image without misalignment along the joint line.

Figure 9:
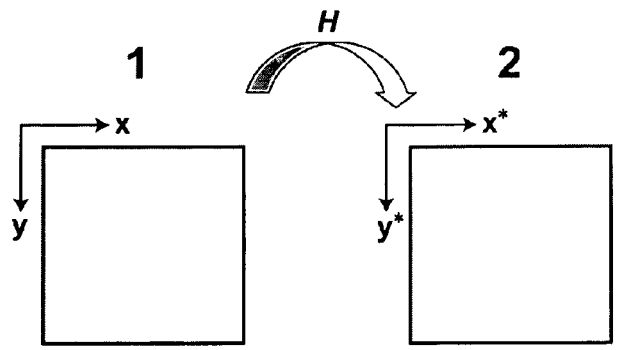
FIG. 9 is a diagram illustrating coordinate systems of the image before and after image correction.

As a specific example of an image transformation process using the above-described transformation matrix, a two-dimensional projective transformation is described. As shown at "1" and "2" in FIG. 9, coordinate systems before and after the two-dimensional projective transformation using the transformation matrix H are referred to as an xy coordinate system and an x*y* coordinate system, respectively. Generally, the two-dimensional projective transformation is expressed, in a homogeneous coordinate system, by equation 8 below:

$$(x \quad y \quad 1)\begin{pmatrix} a & b & p \\ c & d & q \\ t_x & t_y & s \end{pmatrix} = (X^* \quad Y^* \quad w^*)$$ Equation 8 where $$X^* = w^* x^*, Y^* = w^* y^*$$

$$H = \begin{pmatrix} a & b & p \\ c & d & q \\ t_x & t_y & s \end{pmatrix}$$

It should be noted that the homogeneous coordinate system handles a n-dimensional problem as a (n+1)-dimensional problem to simplify and generalize the calculation. The transformation matrix H has nine components, however, has eight degrees of freedom. The transformation matrix H can therefore be found when correspondence of at least four points are obtained (that is, two equations with respect to the xy coordinates are obtained for correspondence of each point).

When the transformation matrix H has been obtained, the original image data I can be corrected to provide a corrected image data I' according to the equation below:

$$I' = HI$$

In the above-described embodiment, although the image data is corrected based on the inclination of the imaging plane 102 by the angles $\alpha$ and $\gamma$ to eliminate the image distortion due to the inclination, such correction may not be carried out and the position of the imaging plane 102 may manually be modified to eliminate the inclination of the imaging plane 102 by the angles $\alpha$ and $\gamma$. Further, the position of the imaging plane 102 may automatically be modified based on the inclination angles $\alpha$ and $\gamma$ with an imaging plane position modifying means, which is incorporated in the radiographic image detector D.

As the marker usable in the invention, the above-mentioned grid is also applicable, besides the markers M1 and M2 representing two points.

Figure 15:
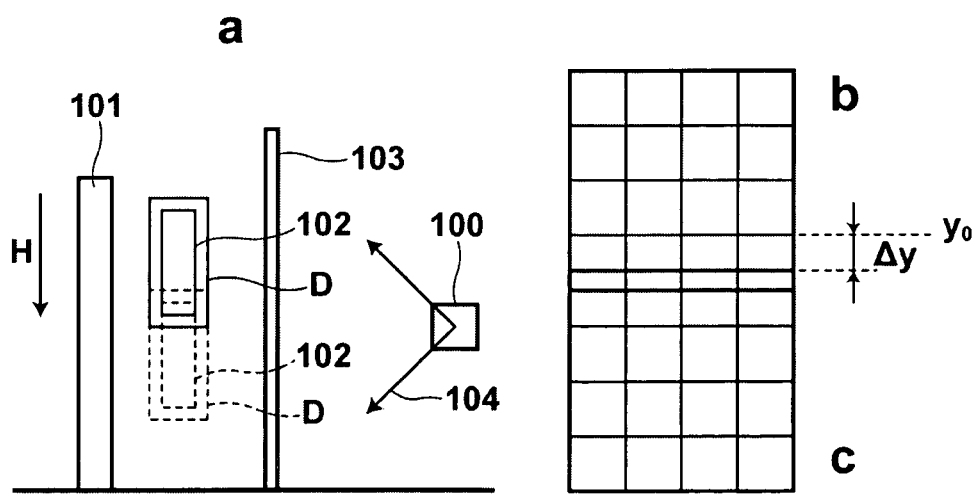
FIG. 15 is a diagram for explaining yet still another prior-art problem.
Figure 16:
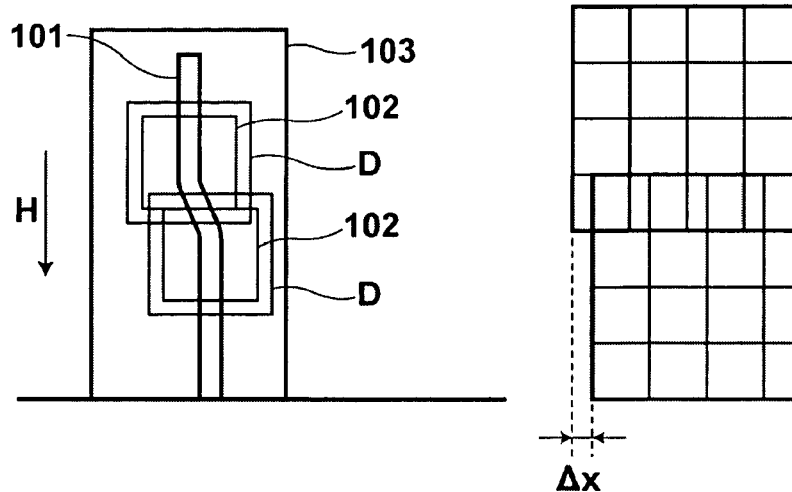
FIG. 16 is a diagram for explaining yet still another prior-art problem.

Next, another embodiment of the image correction method of the invention for correcting for image distortion due to the previously-described inclination angles $\alpha$ and $\gamma$ and the displacements $\Delta y$ and $\Delta x$ respectively shown in FIGS. 15 and 16 is described. In the following description, the inclination angle $\alpha$ may particularly be referred to as a "pitching inclination angle", and the radiographic image detector D may simply be referred to as a "panel" for clarity and convenience of explanation. Assuming that a point on an image taken with a panel which is inclined and/or displaced is expressed in an x-y coordinate system, and a position on a final corrected image is expressed in an x"-y" coordinate system, the image correction method of this embodiment calculates which point (x", y") the image data at the point (x,y) should be related to.

Figure 17:
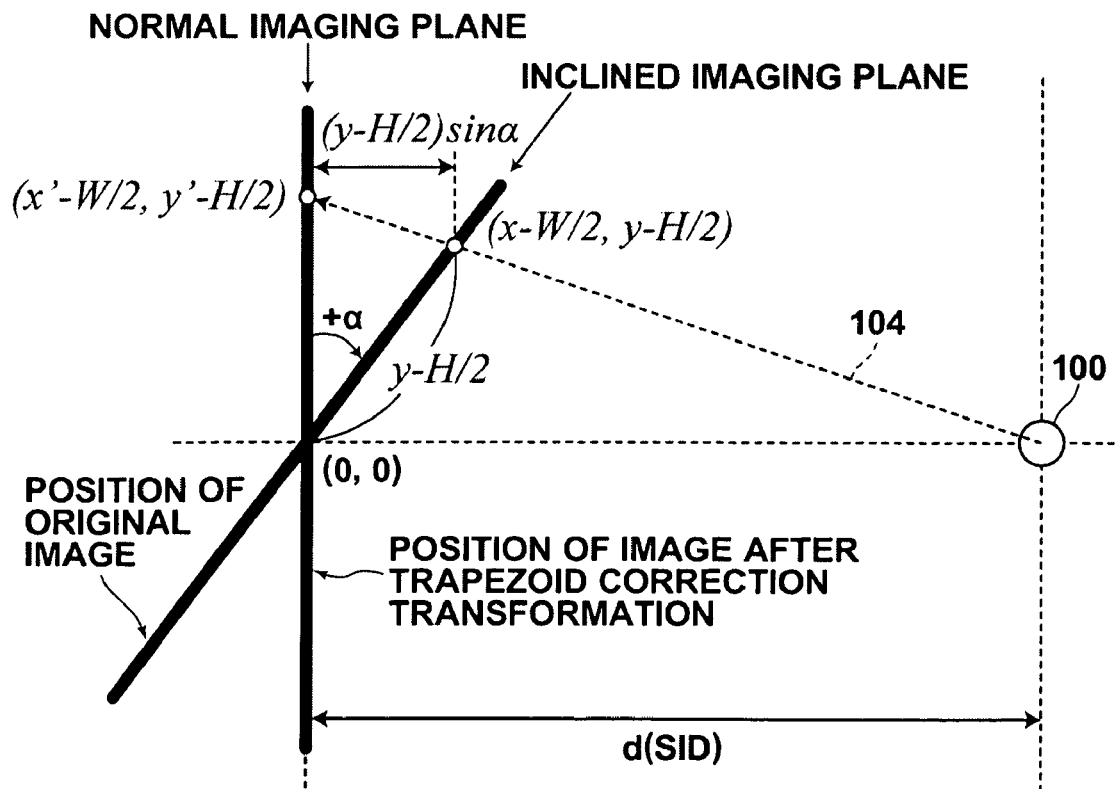
FIG. 17 is a schematic diagram for explaining one example of the image correction method according to the invention.

First, how trapezoidal distortion of a taken image, as shown in FIG. 10, due to the inclination of the panel by the pitching inclination angle $\alpha$ is corrected, as shown in FIG. 17, is described. This correction is hereinafter referred to as "trapezoid correction". In this example, the imaging plane is not inclined relatively to the panel, and thus the pitching inclination angle $\alpha$ of the panel is equal to the inclination angle $\alpha$ of the imaging plane, i.e., the two-dimensional matrix of the pixel sections. In FIG. 17, the "normal imaging plane" refers to an imaging plane which is free of the pitching inclination angle $\alpha$. Assuming that a point on the normal imaging plane is expressed in an x'-y' coordinate system, the trapezoid correction calculates which point (x',y') the image data at the point (x,y) should be related to. Here, α: the pitching inclination angle (−90°<α<+90°),
x,y: coordinates on the inclined panel (actual image data),
x',y': coordinates on the image transformed through the trapezoid correction,
d: SID (Source Image Distance, i.e., a distance between the panel and the radiation source),
W: image width, and
H: image height.

From FIG. 17, an enlargement/reduction factor of the image in the x-direction due to the presence of the pitching inclination angle α is as follows:

$$d:d-y\sin\alpha=x':x \qquad \text{Equation 9}$$

Moving the origin of the coordinate system from a point on the inclined imaging plane, which a normal line crossing through the center of the radiation source 100 hits, to a point on the normal imaging plane, which a normal line crossing through the center of the radiation source 100 hits, i.e., the point (0,0) shown in FIG. 17, the following equation is obtained from equation 9 above:

$$d:d-(y-H/2)\sin\alpha=x'-W/2:x-W/2$$

Thus, the relationship between the point (x,y) and the point (x',y') is as follows:

$$x' = \frac{d}{d-(y-H/2)\sin\alpha}(x-W/2)+W/2 \qquad \text{Equation 10}$$
$$y' = y$$

To be more precise, the image may also be enlarged or reduced in the y-direction; however, it is assumed here that the enlargement or reduction of the image in the y-direction is sufficiently small and can be approximated as y'=y.

Figure 13:
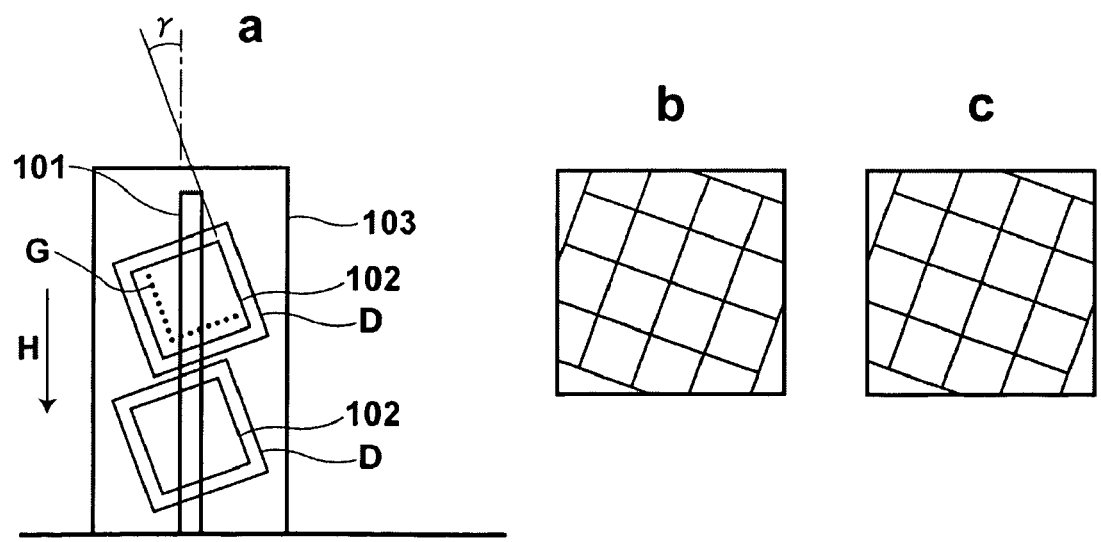
FIG. 13 is a diagram for explaining yet another prior-art problem.
Figure 14:
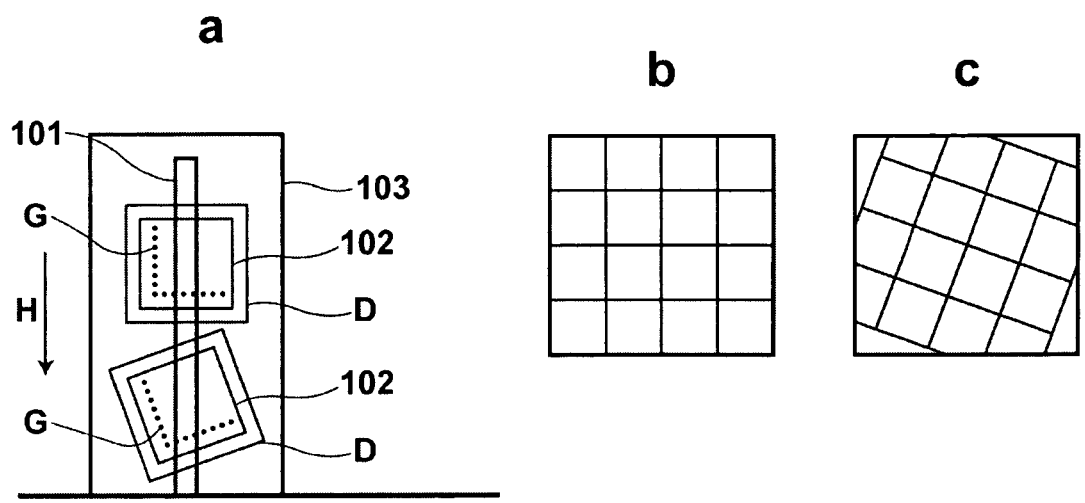
FIG. 14 is a diagram for explaining yet still another prior-art problem.

Next, how image distortion due to the inclination angle γ shown in FIGS. 11 and 13 and the displacements Δy and Δx respectively shown in FIGS. 15 and 16 is corrected is considered. In this example, the displacements Δy and Δx are expressed as Δx=$t_x$ and Δy=$t_y$. The conditions here are as follows:

(x,y): coordinates on the original image,
(x',y'): coordinates on the image transformed through the trapezoid correction,
(x", y"): coordinates on the final corrected image,
$t_x$: translation in the x-direction,
$t_y$: translation in the y-direction, and
γ: rotational angle in the x-y plane.

The relationship between the point (x,y) before the trapezoid correction transformation and the point (x',y') after the trapezoid correction transformation is as expressed by equation 10 above. Expressing the point on the final corrected image in the x"-y" coordinate system, as described above, the relationship between the point (x", y") in this coordinate system and the point (x',y') after the trapezoid correction transformation is as follows:

$$\begin{pmatrix} x'' \\ y'' \\ 1 \end{pmatrix} = \begin{pmatrix} 1 & 0 & t_x \\ 0 & 1 & t_y \\ 0 & 0 & 1 \end{pmatrix} \begin{pmatrix} \cos\gamma & \sin\gamma & 0 \\ -\sin\gamma & \cos\gamma & 0 \\ 0 & 0 & 1 \end{pmatrix} \begin{pmatrix} x' \\ y' \\ 1 \end{pmatrix} \qquad \text{Equation 11}$$

Figure 18:
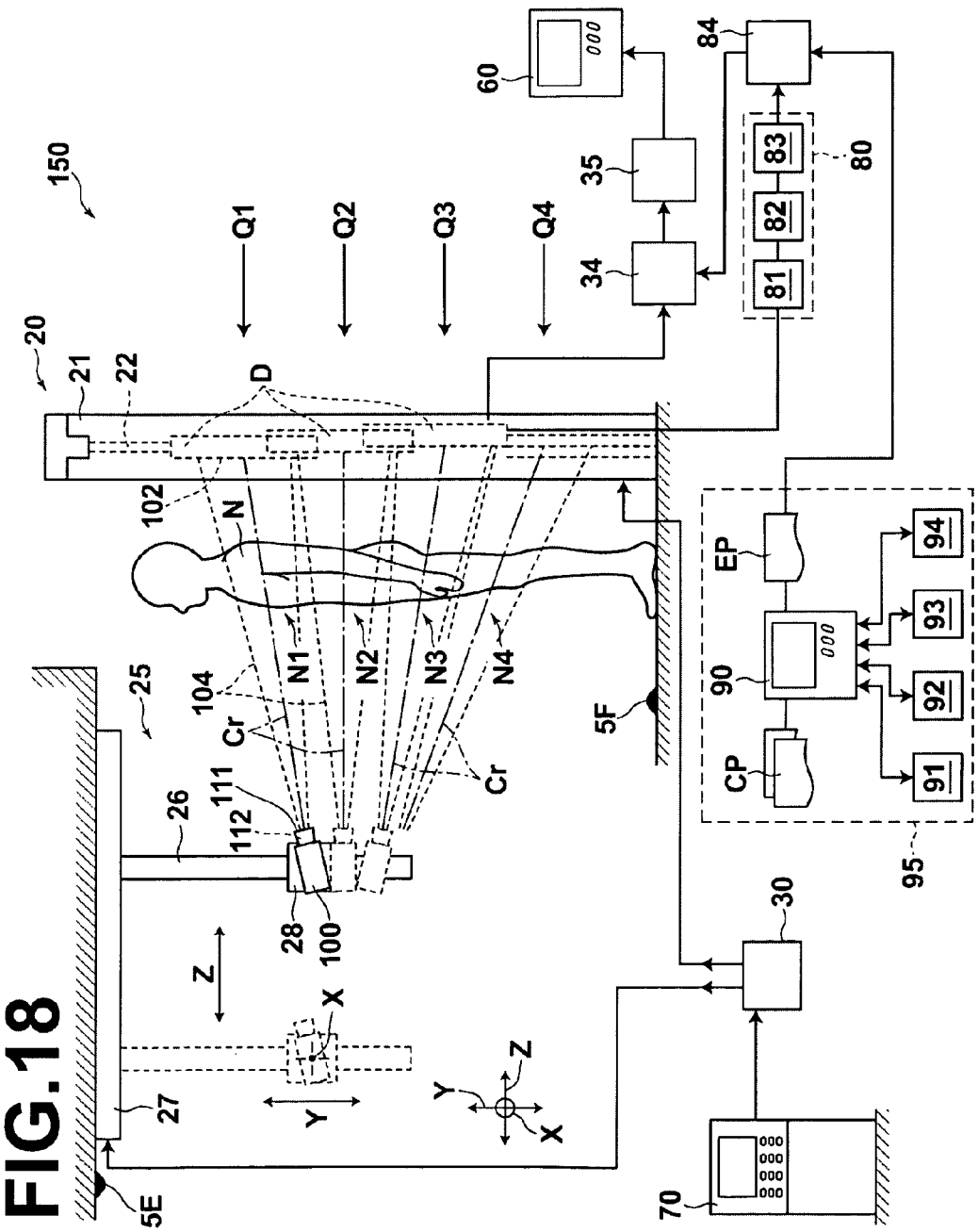
FIG. 18 is a diagram illustrating the schematic configuration of a placement error detection device for detecting placement error of an imaging plane and an image correction device according to one embodiment of the invention.

As described above, applying the two transformation operations expressed by equations 10 and 11, the image data at the point (x,y) is transformed into the image data at the point (x",y"). Thus, by applying the correction achieved through the above-described two transformation operations to transform the original image data associated with the point (x,y), which has been acquired through the reading operation carried out on the radiographic image detector D during each radiation application, into the image data associated with the point (x",y"), and combining the corrected image data to form a single long image, generation of the misalignment along the joint line in the image can be prevented Next, a device for carrying out the above-described placement error detection method and the image correction method are described. FIG. 18 illustrates the schematic configuration of a radiographic imaging device 150, which includes a placement error detection device for detecting placement error of the imaging plane and an image correction device according to one embodiment of the invention. The radiographic imaging device 150 is adapted to acquire a long radiographic image representing a large part of the subject N by sequentially taking radiographic images of adjacent areas N1, N2, . . . , in the subject N using the single radiation source 100 and the single radiographic image detector D, and combining the acquired images.

Specifically, the radiographic imaging device 150 includes: the radiation source 100, which emits radiation 104 through an emission window 111 toward an exposure range defined by a collimator 112; the radiographic image detector D including the imaging plane (radiation detection surface) 102, which detects the radiation 104 transmitted through the subject N and applied to the imaging plane; a detector shifting unit 20, which shifts the radiographic image detector D along the subject N; and a source positioning unit 25, which positions the radiation source 100 to provide desired position and orientation of the emission window 111. In FIG. 18, "Cr" denotes the central axis of the radiation 104 with the exposure range defined by the collimator 112.

The basic configuration of the radiographic image detector D is as is described previously with reference to FIG. 1. The radiographic image detector D detects the radiation 104 transmitted through the subject N and converts the radiation into an electric signal to output image data representing a radiographic image of the subject N.

The detector shifting unit 20 includes: two supporting columns 21, which stand in the vertical direction (the direction of arrow Y in the drawing) from a floor surface 5F to hold the radiographic image detector D therebetween; and a shift mechanism 22, which shifts the radiographic image detector D in the vertical direction, i.e., in the longitudinal direction. The shift mechanism 22 may be formed by a mechanism that supports the radiographic image detector D with a conventionally known linear slide mechanism, etc., and shifts the radiographic image detector D using a drive source, such as a motor.

When radiographic imaging is carried out for acquiring the radiographic images to be combined, the subject N is positioned along the direction in which the radiographic image detector D is shifted. Namely, radiographic imaging is carried out with the subject N standing on the floor surface.

The source positioning unit 25 holds and moves the radiation source 100 so that the radiation source 100 faces the imaging plane 102 of the radiographic image detector D with the subject N standing between the radiation source 100 and the imaging plane 102, i.e., the radiation source 100 is oriented substantially in the direction of arrow Z in the drawing. The source positioning unit 25 includes: a supporting column 26 extending in the vertical direction from a ceiling 5E; a ceiling base 27, which moves the supporting column 26 along the ceiling 5E in the direction of arrow Z in the drawing; and a rotating mount 28, which engages with the supporting column 26 to be movable in the direction of arrow Y in the drawing and rotatable about an axis that is perpendicular to the plane of the drawing. The radiation source 100 is mounted on the rotating mount 28. In this manner, the radiation source 100 is movable in the vertical direction (the direction of arrow Y in the drawing) and in the transverse direction (in the direction of arrow Z in the drawing), and is rotatable about an axis which passes through the substantial center of the radiation source 100 and is parallel to the X-axis in the drawing. The source positioning unit 25 may be formed by conventionally known mechanisms, such as a linear slide mechanism and a rotary mechanism, and a drive source, such as a motor.

The radiographic imaging device 150 further includes a long-image imaging control unit 30, which controls operations of the detector shifting unit 20 and the source positioning unit 25. The long-image imaging control unit 30 controls operation of the detector shifting unit 20 so that the radiographic image detector D is sequentially shifted to positions Q1, Q2, . . . , for taking radiographic images along the direction in which the subject N extends. At the same time, the long-image imaging control unit 30 controls operation of the source positioning unit 25 to position the radiation source 100 such that the application direction of the radiation 104 emitted from the radiation source 100 is oriented toward the imaging plane 102 of the radiographic image detector D when the radiographic image detector D is positioned at each of the above positions. As the radiation source 100 is driven in this state, radiographic images of the adjacent areas N1, N2, . . . , in the subject N are sequentially taken to obtain image data representing each of image portions, which are to be combined to represent the entire subject N, during each imaging operation.

The radiographic imaging device 150 further includes an image combining unit 35, which combines the image data acquired during the radiographic imaging operations to provide a long radiographic image representing the entire subject N. The thus combined long radiographic image is displayed on an image display unit 60, which is formed, for example, by a CRT display device.

The entire operation of the radiographic imaging device 150 is controlled via a console 70. Therefore, information of the subject N, imaging conditions for acquiring a long radiographic image, etc., are inputted to the console 70, and these information are fed, for example, to the long-image imaging control unit 30, an imaging adjusting unit (not shown) for setting the radiation application range defined by the collimator 112, etc. The imaging adjusting unit adjusts the position of the radiation source 100, condition of the collimator 112, the position of the radiographic image detector D, etc., during each radiographic imaging operation so that radiographic images of a predetermined size to be combined are acquired through, for example, four radiographic imaging operations. Then, operations for taking four radiographic images are carried out according to instructions inputted via the console 70.

The size of the four radiographic images taken through the four imaging operations may be determined by defining the radiation application range with the collimator 112, as described above, or by adjusting the length and width of each image portion by cutting out a portion of each radiographic image acquired during each imaging operation.

Next, a process of detecting placement error of the imaging plane of the radiographic image detector D carried out in this device is described. First, a case where the process is automatically carried out by an automatic placement error detection device 80 is described. The automatic placement error detection device 80 includes: a calibration image input unit 81, which obtains image data from the radiographic image detector D; a marker detection unit 82, which receives the output from the calibration image input unit 81; and a placement error detection unit 83, which receives the output from the marker detection unit 82. The output from the placement error detection unit 83 is fed to a parameter calculation unit 84.

When the placement error detection of the imaging plane is carried out, radiographic imaging operations and reading operations for reading the radiographic images taken through the radiographic imaging operations for the placement error detection are carried out separately from usual radiographic imaging operations of the subject, according to an imaging menu inputted via the console 70, for example. A series of operations from these operations to operations for obtaining correction parameters are referred to as "calibration", and radiographic images acquired during the calibration are referred to as "calibration images". During this calibration, the radiographic image detector D is sequentially shifted to the positions Q1, Q2, . . . , and the radiation 104 transmitted through a marker, such as the markers M1 and M2 described above, is applied to the radiographic image detector D staying at each position.

At this time, radiographic imaging is carried out such that the image of the markers M1 and M2 is commonly captured within the overlapping area on the radiographic image detector D when it is positioned at each of the two adjacent positions Q1 and Q2. This is the same for other two adjacent positions Q2 and Q3, and Q3 and Q4. In order to carry out the radiographic imaging in this manner, the markers may be arranged at an appropriate interval in the vertical direction such that the image of the common markers is captured within any overlapping area on the radiographic image detector D positioned at each of the two positions, or the positions Q1, Q2, . . . , may precisely be defined in advance and the markers may be placed in overlapping positions corresponding to each of the positions Q1, Q2, etc.

When an instruction to take the calibration images is made via the imaging menu, an imaging range of each radiographic image containing the marker, width of each overlapping area, and framing of each image may automatically be set to predetermined values. Further, the above-described markers may be provided on a screen, and when the screen is set in a predetermined receptacle for imaging of the calibration images, a screen detection signal may be generated, and the signal may serve as a trigger for displaying various menus for imaging of the calibration images on a display section of the console 70, for example.

During the imaging of the calibration images with the radiographic image detector D being positioned at each of the positions Q1, Q2, etc., reading operation is carried out on the radiographic image detector D for each imaging operation, and image data representing the calibration image containing the marker is outputted from the radiographic image detector D. The calibration image input unit 81 of the automatic placement error detection device 80 receives the image data and feeds the image data to the marker detection unit 82. The marker detection unit 82 detects the position of the marker based on image data which is sequentially sent from the radiographic image detector D when it is positioned at each of the two adjacent positions (for example, the positions Q1 and Q2) and receives the applied radiation (hereinafter, the two images represented by these image data are referred to as "upper and lower images"), and inputs the information indicating the marker position to the placement error detection unit 83. In order to determine the position of the marker in each calibration image, a known technique, such as template matching, may be used.

As the placement error detection unit 83 receives the information indicating the marker position, the placement error detection unit 83 detects the placement error of the imaging plane of the radiographic image detector D at the two adjacent positions, i.e., the above-described inclination angles α and γ and the displacements Δy and Δx, based on the received information. The placement error detection unit 83 inputs the information indicating the placement error to a parameter calculation unit 84. As the parameter calculation unit 84 receives this information, the parameter calculation unit 84 calculates parameters used in the image transformation from the inclination angles α and γ and the displacements Δy and Δx, and inputs the parameters to the image correction unit 34.

Basically, usual radiographic imaging operations, i.e., radiographic imaging operations to sequentially take radiographic images of the adjacent areas N1, N2, etc., in the subject N, which are to be combined to form the long image, are carried out after the above-described calibration has been completed. However, the calibration may be carried out, as necessary, in the course of usual radiographic imaging operations which is carried out on a daily basis. During the usual radiographic imaging operations, the image data sequentially sent from radiographic image detector D when it receives the applied radiation at each of the two adjacent positions (for example, the positions Q1 and Q2) is fed to the image combining unit 35, where the image data are combined to form the combined image, as described above. Before the image data are combined, the image data are subjected, at the image correction unit 34, to correction based on the above-described parameters to eliminate image distortion due to the placement error of the imaging plane.

This correction is achieved by the previously-described two-dimensional projective transformation. Therefore, the parameters are specifically the values of the (3×3) transformation matrix used for the two-dimensional projective transformation. Using the thus corrected image data to form the combined image, generation of the misalignment along the joint line in the image can be prevented, as has been described in detail previously.

Besides the parameters described as examples above, shear factors, etc., may be applied as the parameters to achieve more accurate elimination of the image distortion. Namely, it is known in the two-dimensional projective transformation that shear transformation may occur depending on ratios of coefficients a, b, c and d of the (3×3) transformation matrix, and the coefficients a, b, c and d are called the shear factors. When the two-dimensional projective transformation is carried out using these shear factors to take the shear transformation into account, more reliable elimination of the image distortion due to the placement error of the imaging plane can be achieved. More detailed description of the shear transformation and the shear factors is found in Fujio Yamaguchi, "Zukei-Shori-Kougaku (graphical processing engineering)", published by The Nikkan Kogyo Shimbun, Ltd., 1981, pp. 73-75.

In the above-described embodiment, the radiographic imaging operations are carried out such that the image of the common marker is captured in all the overlapping areas on radiographic image detector D, i.e., the overlapping area corresponding to the positions Q1 and Q2, the overlapping area corresponding to the positions Q2 and Q3, and the overlapping area corresponding to the positions Q3 and Q4, and the marker position is detected each time. However, the radiographic imaging operations may be carried out such that the image of the common marker is captured in some of the overlapping areas (for example, the overlapping area corresponding to the positions Q1 and Q2 and the overlapping area corresponding to the positions Q3 and Q4), and only these marker positions may be detected. In this case, the marker position in the remaining overlapping area (the overlapping area corresponding to the positions Q2 and Q3 in this example) may be interpolated from the actually detected marker positions.

Further, the inclination angles α and γ and the displacements Δy and Δx with respect to the overlapping area for which the imaging of the marker has not been carried out can be interpolated from the actually detected marker positions as well as the inclination angles α and γ and the displacements Δy and Δx calculated based on the marker positions. The interpolation may be achieved with any of known methods, such as linear interpolation or spline interpolation.

Figure 19:
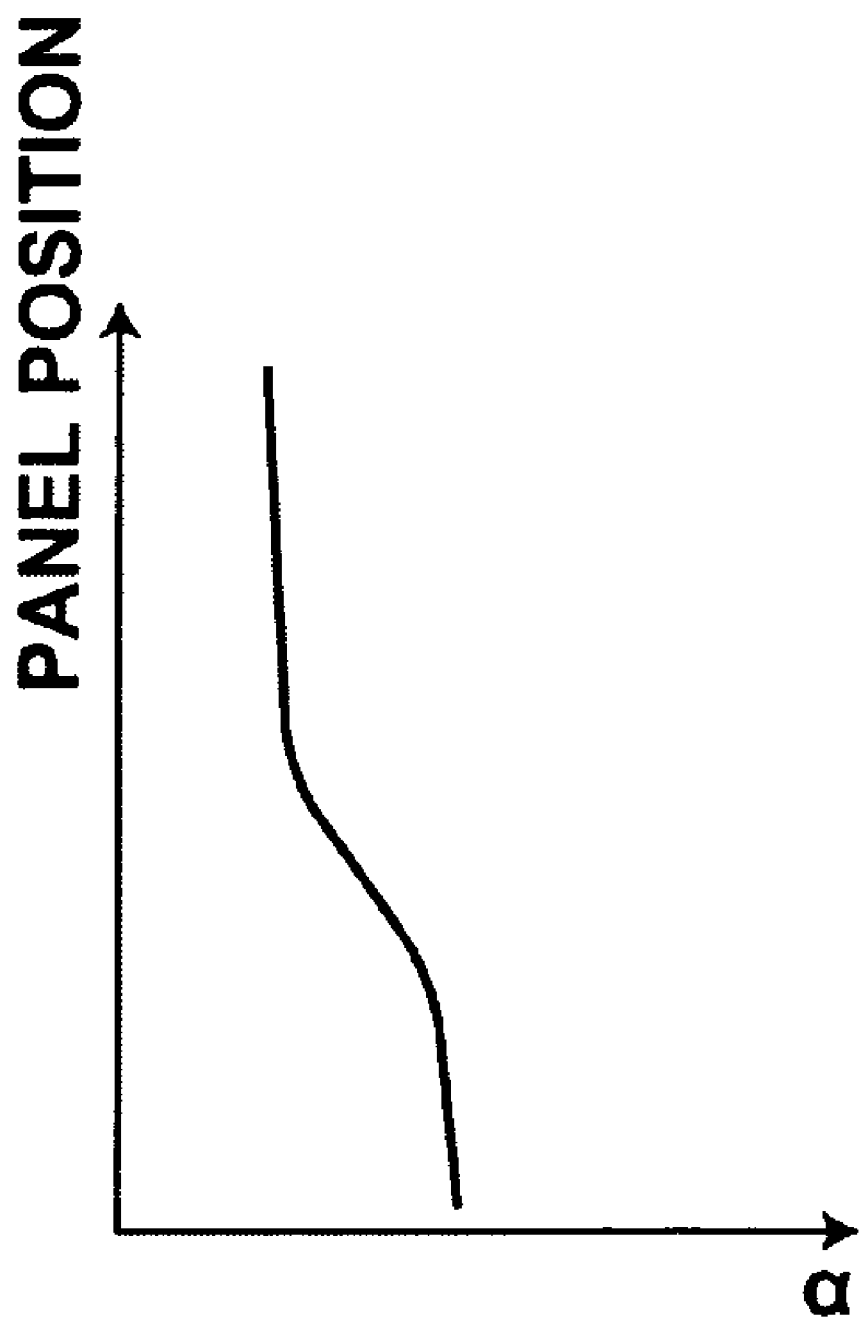
FIG. 19 is a graph showing one example of the relationship between a position of the imaging plane and the placement error.

In this case, the inclination angles α and γ and the displacements Δy and Δx may vary depending on the shift position (panel position) of the radiographic image detector D due to lack of accuracy of a linear slide mechanism forming the shift mechanism 22, for example. FIG. 19 shows an example of characteristics in which the inclination angle α, for example, changes depending on the panel position. Therefore, in a case where the inclination angle α, etc., is obtained through interpolation, as described above, it is desirable to carry out the interpolation with taking the characteristics as shown in FIG. 19 into account.

Further, the transformation parameters for correcting for the image distortion may be calculated from the placement error of the imaging plane, such as the above-described inclination angle α associated with the panel position. The thus calculated parameters may be associated with the panel positions and stored in a storage means in advance, and when a panel position is detected, the stored parameters associated with the panel position may be read out from the storage means to be used for the transformation, without calculating the transformation parameters for each time the transformation operation is carried out.

In stead of carrying out the above-described interpolation, several values of the placement error of the imaging plane, such as the inclination angle α, may be calculated and the values may be averaged to use the average value as the placement error of the imaging plane for all the positions of the radiographic image detector D.

The above-described case is where the placement error of the imaging plane is automatically detected by the automatic placement error detection device 80. The device shown in FIG. 18 also includes a user-responsive placement error detection device 95. Now, how the placement error of the imaging plane is detected with the user-responsive placement error detection device 95 is described.

As shown in FIG. 18, the user-responsive placement error detection device 95 includes, in addition to the console 90, an image input unit 91, a corresponding point input unit 92, a placement error detection unit 93 and a placement error saving unit 94, which are individually connected to the console 90. The image input unit 91, which is a means to obtain the image data outputted from the radiographic image detector D, causes the console 90 to input the calibration images CP, which are as described above. The images may be inputted on-line, as with the case of the automatic placement error detection device 80, or may be inputted off-line by recoding the image data in any of various disks and reading out the image data.

The console 90 causes two of the inputted calibration images CP to be displayed on a pixel display section to allow the user to input the positions of the marker, such as the markers M1 and M2 (see FIG. 3, etc.), contained in the calibration images CP as corresponding points using the corresponding point input unit 92, which is formed by a mouse, or the like. It should be noted that, as the two calibration images CP, those taken with the radiographic image detector D at the two adjacent positions Q1 and Q2 are used, similarly to the previously-described case.

The placement error detection unit 93 detects the inclination angles α and γ and the displacements Δy and Δx based on the marker positions indicated by the inputted corresponding points, in the same manner as the detection by placement error detection unit 83 of the automatic placement error detection device 80. The inclination angles α and γ and the displacements Δy and Δx, which are the placement error of the imaging plane, are stored and saved in the placement error saving unit 94. Thereafter, when an instruction to carry out the transformation is inputted to the console 90 at an appropriate time, the console 90 reads out the placement error EP stored and saved in the placement error saving unit 94, and inputs the placement error EP to the parameter calculation unit 84.

In the following operations, the parameter calculation unit 84 calculates the parameters and the image correction unit 34 applies the transformation based on the parameters to the image data which represents the radiographic images acquired in usual radiographic imaging operations, in the same manner as the previously-described case of the automatic placement error detection device 80. Using the thus transformed image data to form the combined image, generation of the misalignment along the joint line in the image can be prevented.

It should be noted that, in stead of storing and saving the placement error in the placement error saving unit 94, the parameters calculated by the parameter calculation unit 84 may be stored and saved in a storage means, and when the transformation is carried out by the image correction unit 34, the parameters to be used may be read out from the storage means.

Figure 20:
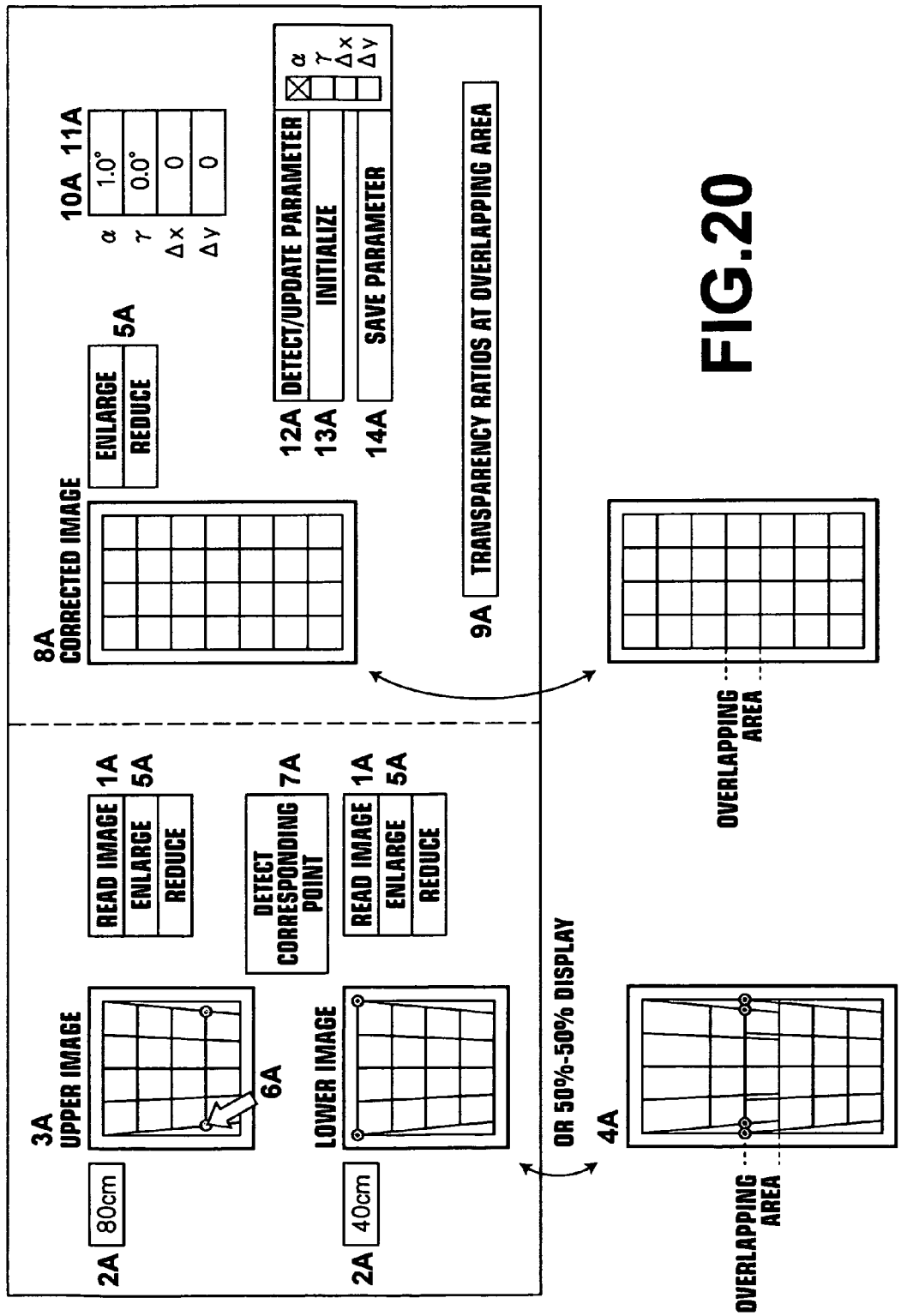
FIG. 20 is a diagram for explaining a placement error detection method and the image correction method according to another embodiment of the invention.

Next, functions of the user-responsive placement error detection device 95 are described in detail with reference to FIG. 20. Functions (1)-(14) listed below are primary functions of the user-responsive placement error detection device 95. FIG. 20 shows display screens which may be displayed on an image display means of the console 90, for example, to allow the user to use any of the functions (1)-(14). How these functions are implemented is described below.

(1) Function to Select Inputted Images to be Displayed

When the user clicks on areas 1A on the display screen with a mouse, or the like, identification numbers of the inputted images are displayed, and then the user clicks on a desired identification number to select the inputted image.

(2) Function to Display Positional Information (Height) of the Imaging Plane Associated with the Image The information is displayed at areas 2A on the display screen.

(3) Function to Separately Display the Upper and Lower Images

The images are displayed at areas 3A on the display screen.

(4) Function to Display 50% Reduced Images of the Upper and Lower Images with the Overlapping Area This function is used in place of function (3) above. The upper and lower images, which are transparent to each other, are displayed in an overlapping state at an area 4A on the display screen.

(5) Function to Enlarge or Reduce the Displayed Image

The user clicks on areas 5A on the display screen with the mouse, or the like, to select enlarged display or reduced display.

(6) Function to Input the Corresponding Points Between the Upper and Lower Images with Mouse Click When user indicates a corresponding point with a cursor, as shown at an area 6A on the display screen, and clicks on the corresponding point with the mouse, or the like, the corresponding point is inputted.

(7) Function to Automatically Detect the Corresponding Points, or Function to Automatically Detect More Detailed Corresponding Points Around the Inputted Corresponding Points As the user clicks on an area 7A on the display screen with the mouse, or the like, the corresponding points are automatically detected.

(8) Function to Calculate the Parameters from the Detected Placement Error and to Display the Image Corrected Using the Parameters The corrected image is displayed at an area 8A on the display screen.

(9) Function to Select Transparency Ratios at the Overlapping Area in the Displayed Corrected Image When the user clicks on an area 9A on the display screen with the mouse, or the like, transparency ratios are displayed, and then the user clicks on a desired transparency ratio to select the transparency ratio. The ratios are displayed, for example, as "upper image 50%", "lower image 50%", etc. When a transparency ratio R of one of the images is selectable within the range from 0% to 100%, the transparency ratio of the other image is (100%−R).

(10) Function to Display the Placement Error

The placement error is displayed at an area 10A on the display screen.

(11) Function to Allow Manual Adjustment of the Placement Error and to Equally Reflect the Adjustment on the Corrected Images, or Function to Allow Fine Adjustment of the Individual Values The values are adjusted by the user placing a cursor on an area 11A on the display screen and operating (such as rotating) a mouse dial, or the like.

(12) Function to Detect and Update the Placement Error (Selectable)

As the user clicks on an area 12A on the display screen with the mouse, or the like, the placement error is detected and updated.

(13) Initialization Function to Return the Placement Error to Default Values (Selectable)

As the user clicks on an area 13A on the display screen with the mouse, or the like, values of the placement error are initialized.

(14) Function to Save the Detected Placement Error (Selectable)

As the user clicks on an area 14A on the display screen with the mouse, or the like, the detected placement error is saved.

With the user-responsive placement error detection device 95 having the above-described functions, any of five procedures (A)-(D) below may be used to detect the placement error of the imaging plane.

(A) Automatic Corresponding Point Detection

Select the inputted images via the function (1).

Automatically detect the corresponding points (through template matching across a predetermined range, for example).

Detect the placement error from the corresponding points.

(B) Semiautomatic Corresponding Point Detection
  Select the inputted images via the function (1).
  Input the corresponding points on the reduced images via the function (6).
  Automatically detect more detailed corresponding points around the corresponding points (through template matching across a predetermined range, for example).
  Detect the placement error from the corresponding points.
(C) Manual Corresponding Point Input
  Select the inputted images via the function (1).
  Enlarge the images via the function (5).
  Input the corresponding points at 1:1 scale accuracy via the function (6).
  Detect the placement error from the corresponding points.
(D) Manual Placement Error Detection
  Select the inputted images via the function (1).
  Manually detect the placement error by manually aligning the corrected images via the function (9).

The present invention has been described in conjunction with a radiographic imaging device which takes a long image of a subject in the standing position. However, the present invention is not limited to use with such devices, and may also be applicable to radiographic imaging devices which take a long image of a subject in the supine position.

What is claimed is:

1. An image correction method using an inclination detected with a placement error detection method to be used with a radiographic image detector to detect placement error of an imaging plane of the radiographic image detector, the imaging plane including a two-dimensional matrix of pixel sections, each pixel section storing, when exposed to radiation, an electric charge according to an amount of the radiation, the radiographic image detector outputting image data representing radiographic image information of a subject acquired through a reading operation, the radiographic image detector being used to be exposed to radiation transmitted through the same subject each time the radiographic image detector is shifted to a different position along a predetermined axis of shift, the method detecting inclination of the matrix relative to the axis of shift, the method comprising:
  applying radiation two times to the radiographic image detector at different radiation application positions effected by the shift of the radiographic image detector so that a common marker is imaged during each radiation application;
  carrying out the reading operation after each radiation application to acquire image data representing radiographic image information of the marker; and
  detecting the inclination based on a positional relationship between marker images represented by the image data acquired during each reading operation,
  wherein the correction method comprises:
  applying radiation transmitted through a subject to the radiographic image detector more than one time with shifting the radiographic image detector between the more than one time of radiation application;
  carrying out the reading operation after each radiation application to acquire image data representing radiographic image information of the subject; and
  applying image processing to at least a part of the image data acquired during each reading operation based on the detected inclination to eliminate misalignment along a joint line in an image of the subject due to the inclination, the misalignment being generated when the image of the subject is formed by combining the image data,
  wherein imaging for detecting placement errors and imaging for performing image correction are executed individually.

2. The method as claimed in claim 1, wherein the inclination comprises an inclination in a plane containing exposure axes of the radiation applied during the two times of radiation application.

3. The method as claimed in claim 1, wherein the inclination comprises an inclination in the imaging plane.

4. The method as claimed in claim 1, wherein the inclination remains unchanged when the radiographic image detector is shifted.

5. The method as claimed in claim 1, wherein the inclination changes along with the shift of the radiographic image detector.

6. An image correction method using a displacement detected with a placement error detection method to be used with a radiographic image detector to detect placement error of an imaging plane of the radiographic image detector, the imaging plane including a two-dimensional matrix of pixel sections, each pixel section storing, when exposed to radiation, an electric charge according to an amount of the radiation, the radiographic image detector outputting image data representing radiographic image information of a subject acquired through a reading operation, the radiographic image detector being used to be exposed to radiation transmitted through the same subject each time the radiographic image detector is shifted to a different position along a predetermined axis of shift, the method detecting a displacement of the matrix from a predetermined position for the matrix when the matrix is exposed to the radiation, the method comprising:
  applying radiation two times to the radiographic image detector at different radiation application positions effected by the shift of the radiographic image detector so that a common marker is imaged during each radiation application;
  carrying out the reading operation after each radiation application to acquire image data representing radiographic image information of the marker; and
  detecting the displacement based on a positional relationship between marker images represented by the image data acquired during each reading operation,
  wherein the correction method comprises:
  applying radiation transmitted through a subject to the radiographic image detector more than one time with shifting the radiographic image detector between the more than one time of radiation application;
  carrying out the reading operation after each radiation application to acquire image data representing radiographic image information of the subject; and
  applying image processing to at least a part of the image data acquired during each reading operation based on the detected displacement to eliminate misalignment along a joint line in an image of the subject due to the displacement, the misalignment being generated when the image of the subject is formed by combining the image data,
  wherein imaging for detecting placement errors and imaging for performing image correction are executed individually.

7. The method as claimed in claim 6, wherein the displacement comprises a displacement in a direction perpendicular to the axis of shift.

8. The method as claimed in claim 6, wherein the displacement comprises a displacement in a direction parallel to the axis of shift.

* * * * *